United States Patent [19]

Numao et al.

[11] Patent Number: 5,684,725

[45] Date of Patent: Nov. 4, 1997

[54] SOLID MODEL SYNTHESIS SYSTEM AND SOLID MODEL SYNTHESIS METHOD

[75] Inventors: Masayuki Numao, Kawasaki; Hiroshi Masuda, Yamata; Hirofumi Matsuzawa, Sagamihara, all of Japan

[73] Assignee: International Business Machines Corp., Armonk, N.Y.

[21] Appl. No.: 534,418

[22] Filed: Sep. 27, 1995

[30] Foreign Application Priority Data

Sep. 28, 1994 [JP] Japan ..................... 6-233695

[51] Int. Cl.⁶ ............. G06T 17/00; G06T 15/00
[52] U.S. Cl. ............. 364/578; 395/120; 395/141
[58] Field of Search ................. 364/488, 489, 364/490, 491, 578, 474.05, 413.22; 395/120, 124, 141, 333–338; 348/51; 139/384 R; 356/376

[56] References Cited

U.S. PATENT DOCUMENTS 5,467,293  11/1995  Summer et al. ............. 364/578

Primary Examiner—Kevin J. Teska
Assistant Examiner—Phallaka Kik
Attorney, Agent, or Firm—Edward H. Duffield

[57] ABSTRACT

A technique to synthesize an accurate solid model from drawing data. Closed regions are detected based on top view data and a closed region list is generated. A tree structure is detected and the list is converted to symbol groups, each of which is a set of symbols representative of the elements of the contour line of the closed region and symbols representative of a connection relationship between the elements. When the converted symbol groups include a symbol group having a specific symbol, that symbol group is divided into a plurality of symbol groups based on that specific symbol. The symbol groups are matched, and the area of the closed region is detected. Symbol groups of closed regions of the same shape are classified and symbol groups of closed regions of the same area are classified. From the classified symbol groups, symbol groups of closed regions having a child of the closed region of the same shape and area are classified, and a solid model is constructed.

18 Claims, 22 Drawing Sheets

(a) Case of E being a line (a) Case of E being a circular arc

SOLID MODEL SYNTHESIS SYSTEM AND SOLID MODEL SYNTHESIS METHOD

FIELD OF THE INVENTION

The present invention relates to a solid model synthesis system and a solid model synthesis method and, more particularly, to a solid model synthesis system and method for synthesis a three-dimensional solid model based on drawing data representative of an input three-dimensional shape.

DESCRIPTION OF THE PRIOR ART

The present applicant has proposed a solid model synthesis system and method for synthesis a solid model from a top view and a sectional view (Patent Application No. 5-245384). More particularly, when a solid model is synthesized from a top view and a sectional view, a three-dimensional shape of the top view is first obtained from the sectional line on the top view and the sectional view corresponding to the sectional line. That is, the three-dimensional shape is obtained by obtaining from the top view the shape on the XY plane and from the sectional view the attribute on the Z axis and by combining them.

However, in the above-described solid model synthesis system and method, a portion to which section information is not supplied by the sectional view is formed into a three-dimensional shape by analogy, and a closed region is classified into groups by the direct matching of the elements constituting the closed region, but there were some cases where the matching can not be performed between closed regions which are different in angle.

The present applicant has also proposed a solid model synthesis system and method in which drawing data is mathematically converted and a solid model is synthesized from three figures, but the portions identical in shape on the three figures are individually formed into a three-dimensional shape and therefore the processing time required for synthesis a solid model was long.

The present invention is made in view of the above-described facts, and an object of the invention is to provide a solid model synthesis system and a solid model synthesis method which are capable of effectively synthesizing an accurate solid model from drawing data.

SUMMARY OF THE INVENTION

Briefly stated, the foregoing and other objects are accomplished by the system and method of the present invention. The system includes a closed region detection means 52 for detecting a plurality of closed regions, each constituted by a contour line, based on drawing data representative of an input three-dimensional shape; drawing data group classification means 54 for classifying said drawing data into a plurality of drawing data groups, each of which is a set of drawing data of each of the detected closed regions, based on the detected closed regions; a symbol group conversion means 56 for converting said plurality of drawing data groups to a plurality of symbol groups, each of which is a set of first symbols representative of elements constituting said contour line of the closed region and second symbols representative of a connection relationship between said elements; a position information detection means 58 for detecting position information representative of a positional relationship between said detected closed regions; an attribute detection means 60 for detecting an attribute of each of said plurality of closed regions, based on the classified drawing data groups; a symbol group classification means 62 for classifying said plurality of converted symbol groups in accordance with the classification of the closed region, based on at least one of the first symbol, the second symbol, position information, and the attribute; a three-dimensional shape formation means 64 for forming said detected closed regions into a three-dimensional shape, based on the classified symbol groups; and a solid model synthesis means 66 for synthesis a three-dimensional solid model by combining the closed regions formed into the three-dimensional shape, based on the detected position information.

DESCRIPTION OF THE PREFERRED EMBODIMENT

Figure 1:
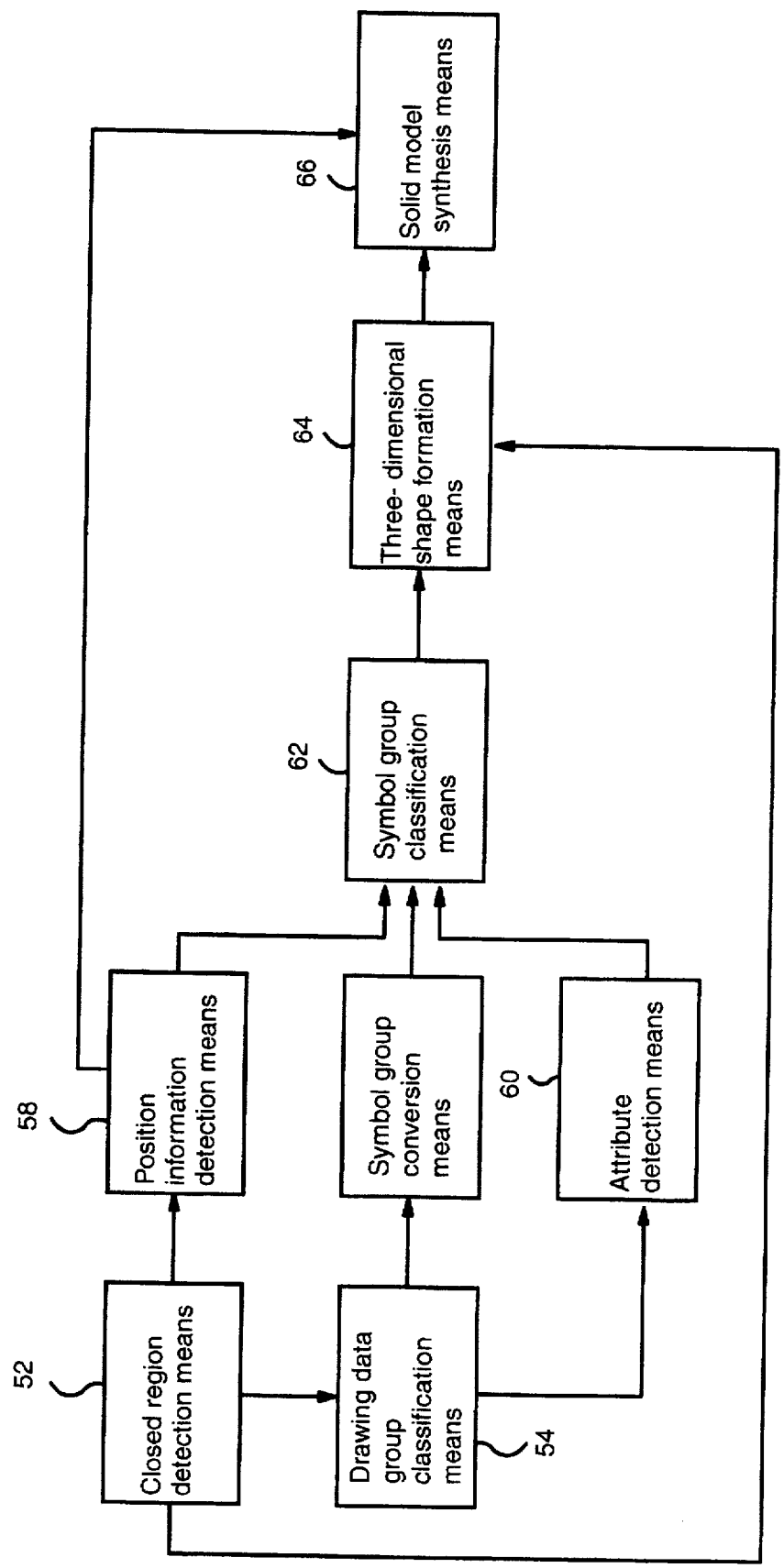
FIG. 1 is a block diagram showing the essential elements of the system of the present invention.

Referring now to the drawings, and first to FIG. 1, the closed region detection means 52 detects a plurality of closed regions each constituted by a contour line, based on drawing data representative of an input three-dimensional shape.

The drawing data group classification means 54 classifies said drawing data into a plurality of drawing data groups, each of which is a set of drawing data for each of the detected closed regions, based on the detected closed regions.

The symbol group conversion means 56 converts said plurality of drawing data groups to a plurality of symbol groups, each of which is a set of first symbols representative of elements constituting said contour line of the closed region and second symbols representative of a connection relationship between said elements.

It is to be noted that said plurality of drawing data groups is converted to a plurality of symbol groups by converting each drawing data group of said plurality of drawing data groups to said first symbols representative of elements constituting said contour line of the closed region and said second symbols representative of a connection relationship between said elements, it is determined whether the converted drawing data groups have a symbol group having a specific symbol representative of a specific connection relationship between said elements, and, if said symbol group having a specific symbol is found, said symbol group is divided into a plurality of symbol groups, based on said specific symbol.

The position information detection means 58 detects position information representative of a positional relationship between said detected closed regions. The attribute detection means 60 detects an attribute of each of said plurality of closed regions, based on the classified drawing data groups. It is to be noted that as said attribute, an area of each of said plurality of closed regions is detected.

The symbol group classification means 62 classifies said plurality of converted symbol groups in accordance with the classification of the closed region, based on at least one of the first symbol, the second symbol, position information, and the attribute.

That is, for example symbol groups that are the same are classified from said plurality of converted symbol groups, based on the first and second symbols.

Symbol groups of closed regions that are the same in attribute are classified from the same symbol groups classified, based on said first and second symbols and said attribute.

Symbol groups which are the same and which correspond to a closed region including the closed regions that are the same in attribute are classified from the symbol groups of closed regions of the same attribute classified based on said first symbol, said second symbol, said position information, and said attribute.

To classify the symbol groups that are the same from said plurality of converted symbol groups, for example, symbol groups that are the same are classified from the converted symbol groups, based on a plurality of shape patterns stored in a storage means for storing the shape patterns constituted by said first and second symbols, and on each of said plurality of code groups.

Also, the symbol groups that are the same are classified from said plurality of converted symbol groups by performing matching between the stored shape patterns and each of said plurality of symbol groups.

Further, a symbol group not matching said stored shape patterns is stored in said storage means as a new shape pattern after said matching.

The three-dimensional shape formation means 64 forms said detected closed regions into a three-dimensional shape, based on the classified symbol groups, and the solid model synthesis means 66 synthesizes a three-dimensional solid model by combining the closed regions formed into the three-dimensional shape, based on the detected position information.

Thus, the classified drawing data groups are converted to a plurality of symbol groups, each of which is a set of first symbols representative of elements constituting said contour line of the closed region and second symbols representative of a connection relationship between said elements, said plurality of converted symbol groups are classified in accordance with the classification of the closed region, and the detected closed regions are formed into a three-dimensional shape, based on the classified symbol groups. Since each of the drawing data groups of the closed regions is converted and the closed regions are formed into a three-dimensional shape, the shape of the closed regions can be formed accurately into a three-dimensional shape. Also, if, in order to form the closed regions into a three-dimensional shape based on the classified symbol groups, the closed regions are not formed individually into a three-dimensional shape from drawing data by mathematical conversion but are formed into a three-dimensional shape by forming one symbol group of the classified symbol groups into a three-dimensional shape, other symbol groups can be formed into a three-dimensional shape, based on that formation of a three-dimensional shape of the one symbol group, and therefore the synthesis of a solid model can be performed effectively.

Figure 2:
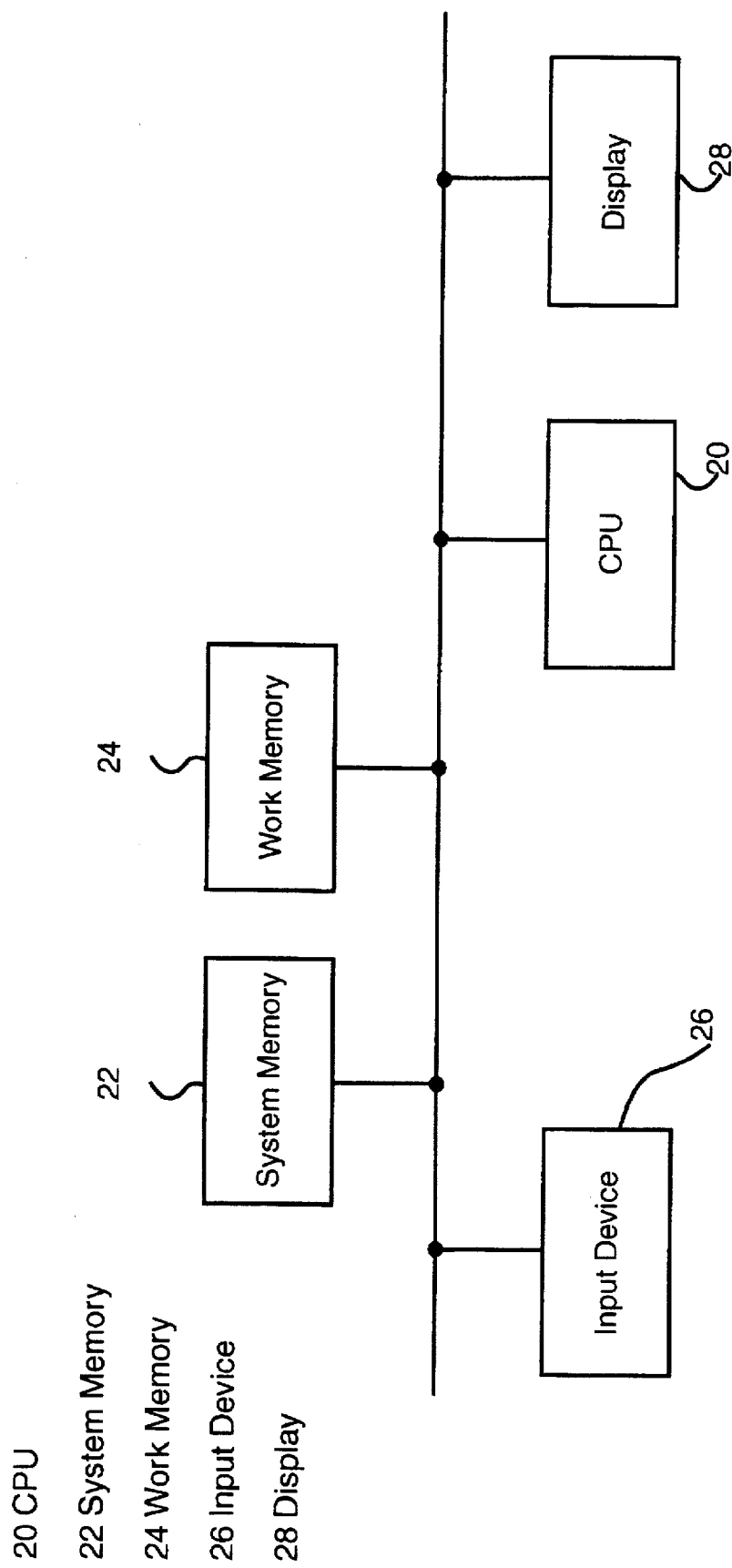
FIG. 2 is a block diagram of a hardware configuration of the system of the present invention.
Figure 15:
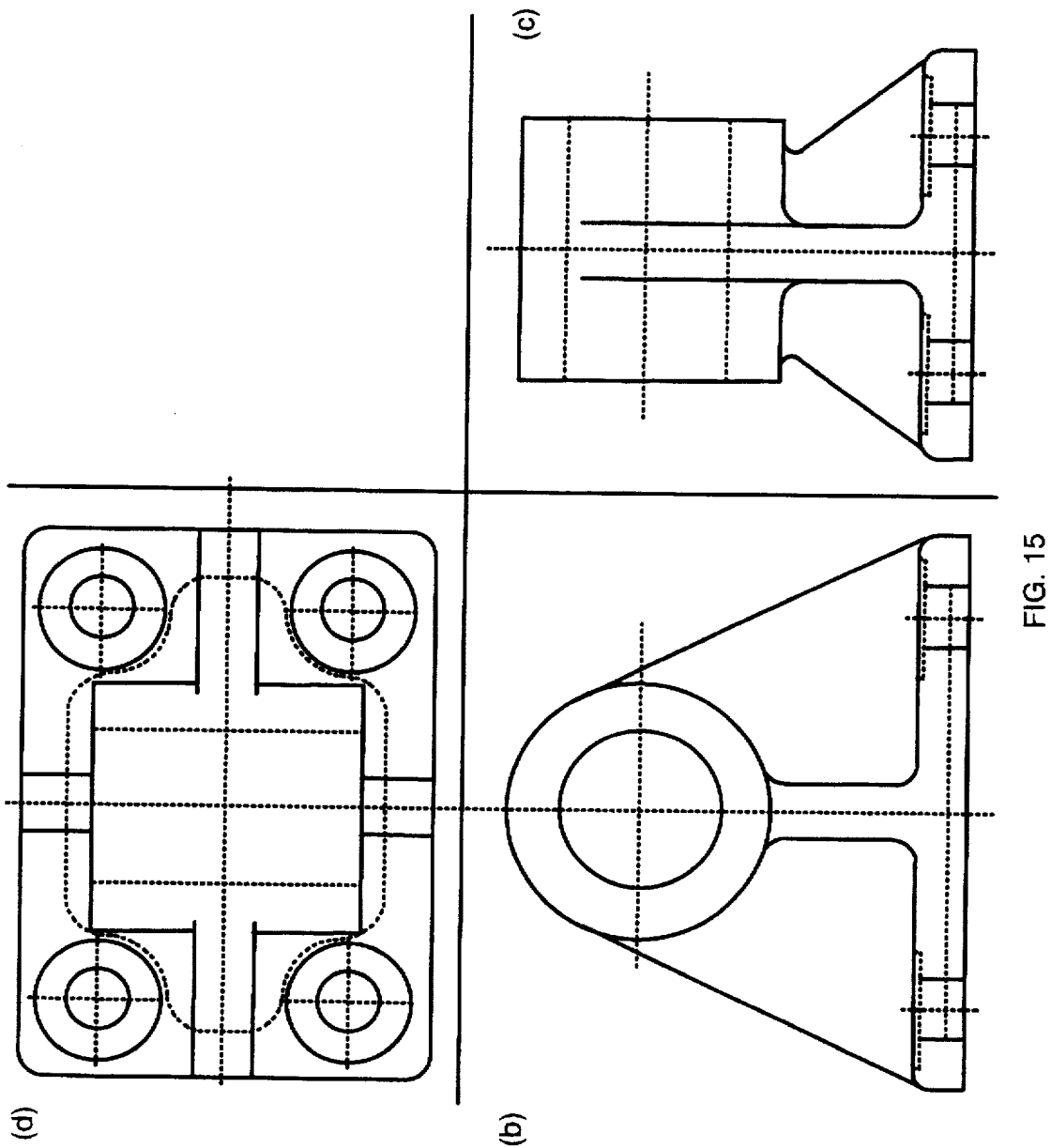
FIG. 15 is an input engineering drawing.

As shown in FIG. 2, the solid model synthesis system 10 comprises a central processing unit (CPU) 20, a system memory 22, a work memory 24, an input device 26, and a display 28, and they are interconnected through a bus. Control routines, which are executed by the CPU 20 and will be described later, are stored in the system memory 22. Also, various types of data input from the input device 26 comprising a keyboard, etc., such as engineering drawing data of engineering drawings (front view (FIG. 15(a), top view (FIG. 15(b), and side view (FIG. 15(c)) described for expressing a three-dimensional shape, are stored in the work memory 24. The engineering drawing data includes line data, circular arc data, and rules for expressing a three-dimensional shape by using drawings.

The operation of this embodiment will next be described with reference to the control routines shown in FIGS. 3 through 14.

Figure 3:
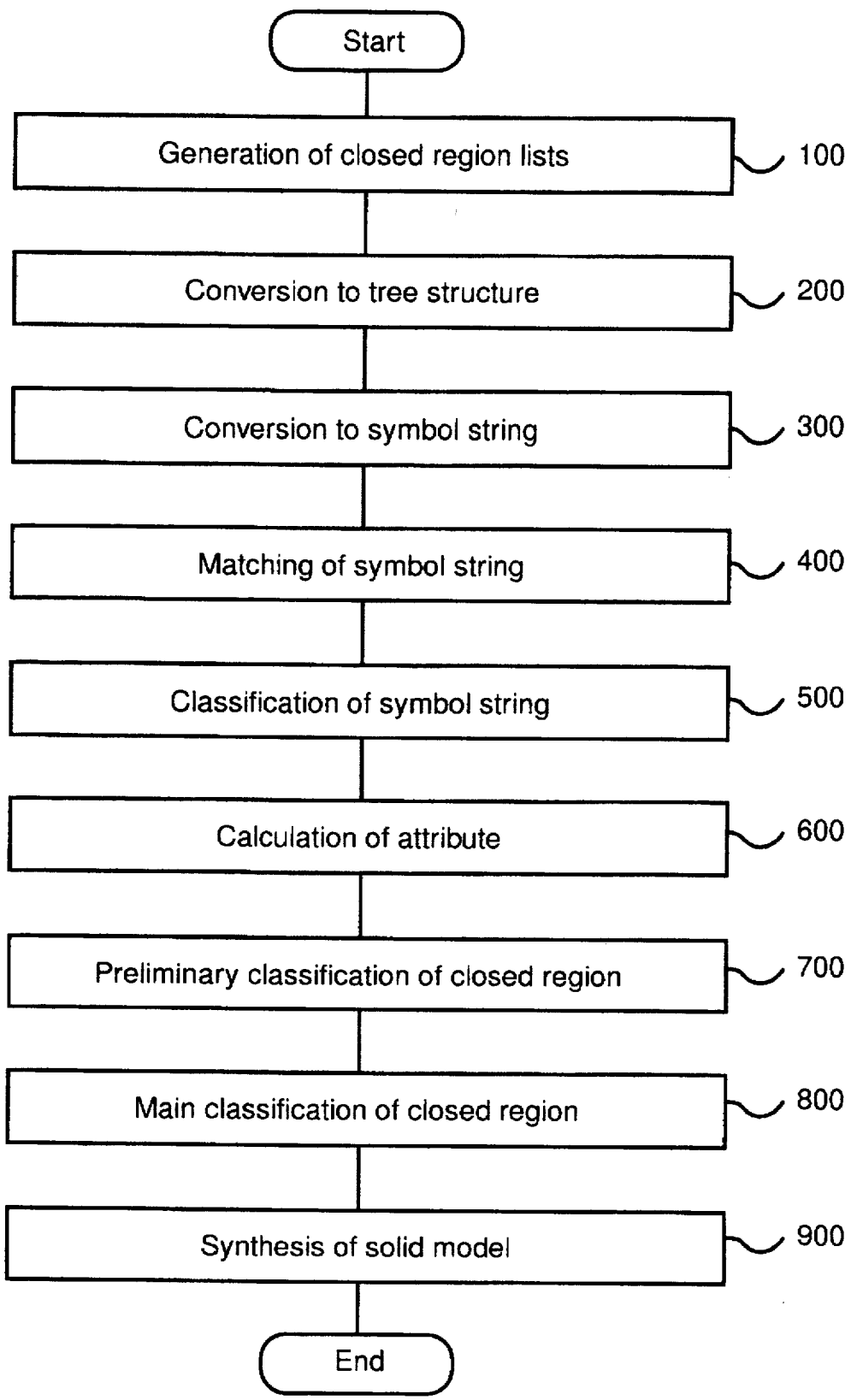
FIG. 3 is a flowchart of a main control routine according to the present invention.

First, in step 100 shown in FIG. 3, a plurality of closed regions, each formed with the contour line of a three-dimensional shape, is detected based on the top view data among input engineering drawing data, and a processing subroutine (FIGS. 4 and 5) is executed for classifying, based on the detected closed regions, the drawing data into a plurality of drawing data groups (hereinafter referred to as a closed region list), each of which is a set for drawing data for each of the closed regions. In the next step, 200, executed a processing subroutine (FIG. 6) is executed for detecting an inclusive (tree structure) relationship between the closed regions which is the position information between the closed regions detected in step 100.

In step 300, a processing subroutine (FIG. 7) is executed for converting the closed region lists into a plurality of symbol groups, each of which is a set of a first symbol representative of the contour line of an closed region, and a second symbol representative of a connection relationship between the contour lines. In step 400, a processing subroutine (FIG. 8) is executed for determining whether a symbol group having a specific symbol (which will be described in detail later) representative of a specific connection relationship between the contour lines exists in the plurality of symbol groups converted and for dividing, when the symbol group having a specific symbol is found, that symbol group into a plurality of symbol groups on the basis of that specific symbol. In step 500, a processing subroutine (FIG. 9) is executed for detecting the shape of the closed region, based on each of a plurality of symbol groups.

In step 600, a processing subroutine (FIG. 10) is executed for detecting the attribute (in this embodiment, area) of a closed region, based on the closed region list.

In step 700, a closed region preliminary classification processing subroutine (FIGS. 11 and 12) is executed for classifying, from the symbol groups, symbol groups of closed regions of the same shape, and further classifying, from the symbol groups of closed regions of the same shape, symbol groups of closed regions of the same area.

In step 800, a closed region main classification processing subroutine (FIG. 13) is executed for further classifying from the symbol groups of closed regions of the same shape and the same area classified in step 700, symbol groups of closed regions including a closed region of the same shape and the same area.

In step 900, a processing subroutine (FIG. 14) for synthesis a solid model is executed and the present processing is completed.

Figure 21:
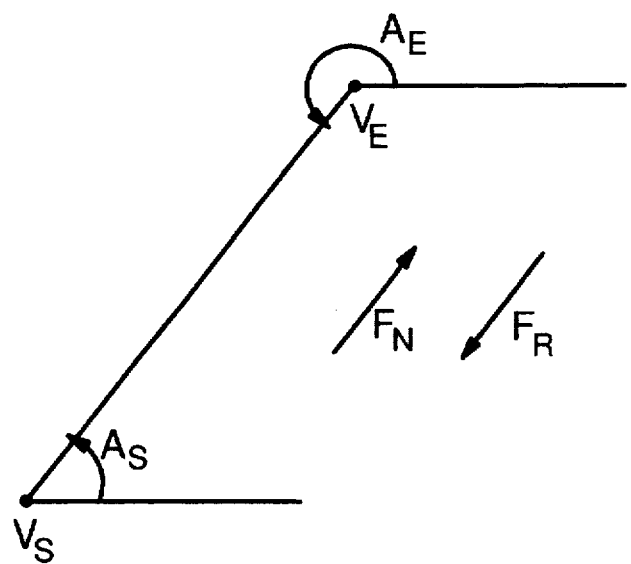
FIG. 21 is a diagram showing the start point, end point, start point angle, end point angle, forward flag, and backward flag of a line.
Figure 21:
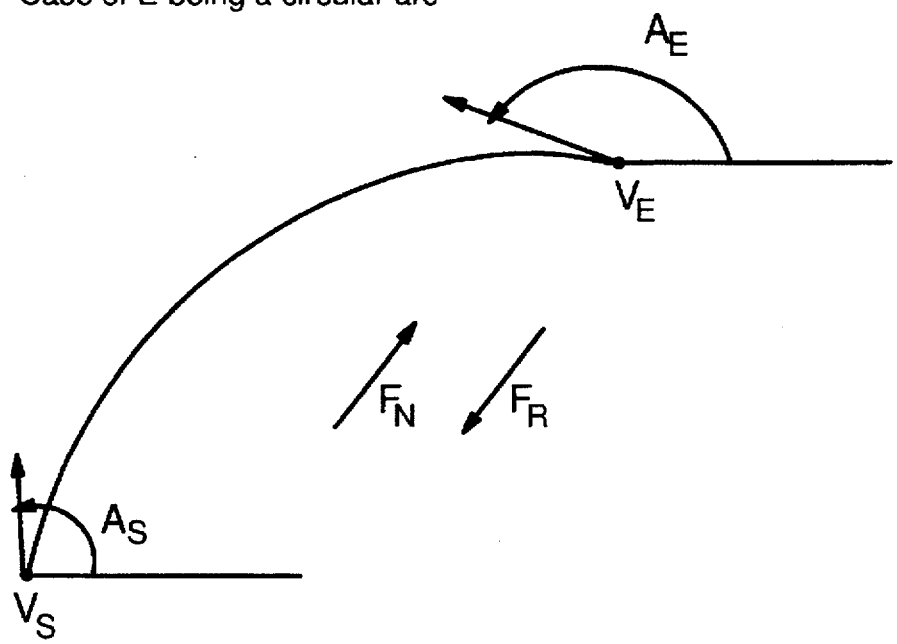

The details (FIGS. 4 and 5) of step 100 will be described next. In the case of three figures, the input engineering drawing data includes front view data, top view data, and side view data, and, in the case of a sectional drawing, it includes plan and sectional view data. In the processing based on this routine of the present invention, the top view data or plan view data of the input drawing data is used. The front view data or plan view data comprises line data and circular arc data, which are constituted by the start points, end points, start point angles, end point angles, forward flags, and backward flags of a line and a circular arc. More particularly, an input variable In is expressed by $\{E_1, E_2, \ldots, E_n\}$, and $E_i$ (i=1 to n) is expressed by a set of ($V_S$, $V_E$, $A_S$, $A_E$, $F_N$, $F_R$). The meaning of the parameters in the parentheses is shown in FIG. 21. That is, $V_S$ represents the start point, $V_E$ the end point, $A_S$ the angle of a tangent at the start point, $A_E$ the angle of a tangent at the end point, $F_N$ the forward flag, and $F_R$ the backward flag.

Figure 4:
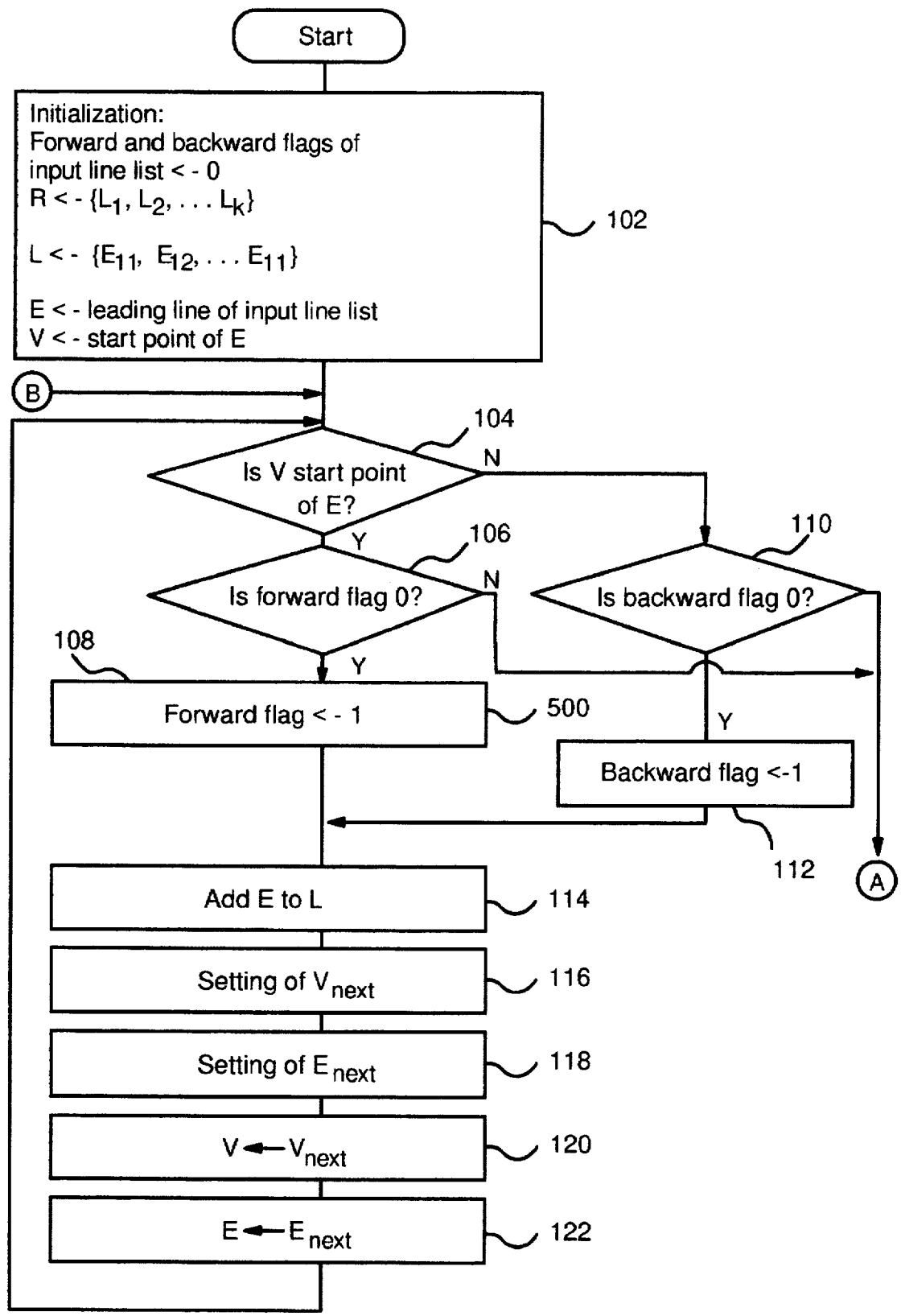
FIG. 4 is a flowchart of part of a subroutine for generating a closed region list according to the present invention.
Figure 5:
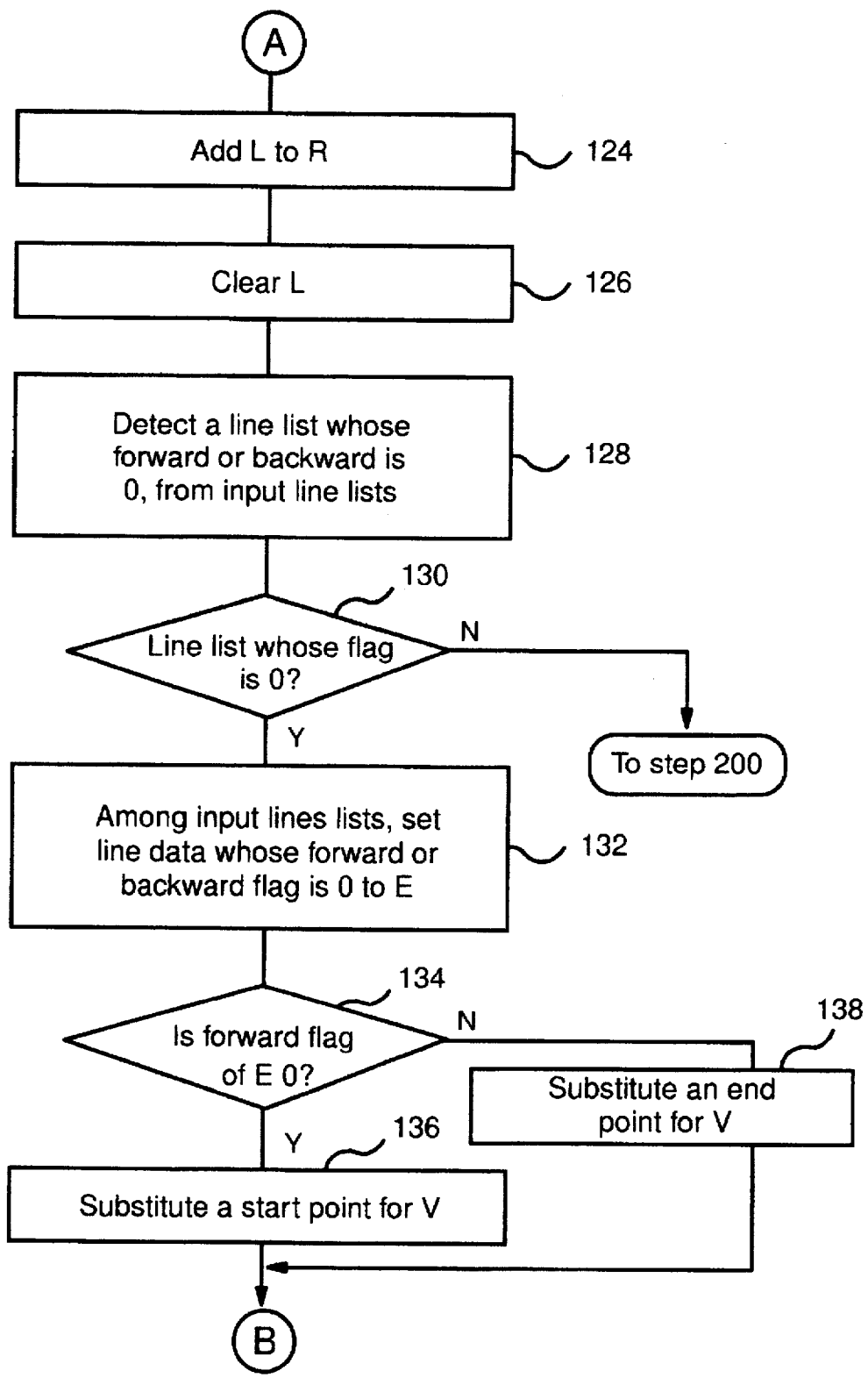
FIG. 5 is a flowchart of the remainder of the subroutine of FIG. 4.
Figure 22:
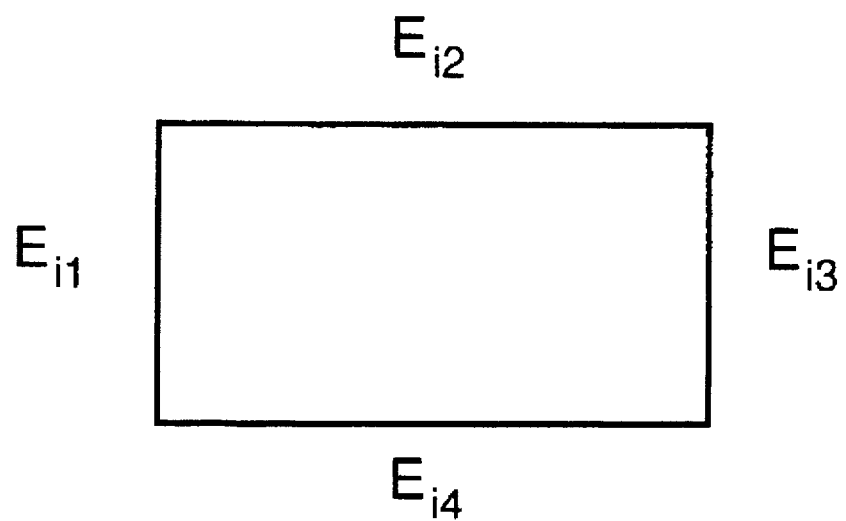
FIG. 22 is a diagram showing a list of lines constituting one closed region, and a closed region corresponding to the lines.

In step 102 shown in FIG. 4, line data is initialized by substituting 0 for all of the flags of line data, and program variables are also initialized. More particularly, R being a closed region list and L being a line list constituting one closed region are cleared, the leading line of an input line list is substituted for a variable E, and the start point of the line E is substituted for a variable V. As shown in step 102, the closed region list R is expressed by $\{L_1, L_2, \ldots, L_k\}$, and $L_j$ is a list of lines constituting a closed region and expressed by $\{E_{i1}, E_{i2}, \ldots, E_{iL}\}$, as shown in FIG. 22. In the next step, 104, it is determined whether V is the start point of E or not. If, on the one hand, V is the start point, it will be determined in step 106 whether the forward flag is 0 or not. If the forward flag is not 0, step 106 will advance to step 124 (FIG. 5). If the forward flag is 0, in step 108, the forward flag will be set to 1 and step 108 will advance to step 114. If, on the other hand, V is not the start point of E, it will be determined in step 110 whether the backward flag is 0 or not. If this backward flag is not 0, step 110 will advance to step 124. If the backward flag is 0, in step 112, the backward flag will be set to 1 and step 112 will advance to the step 114.

In step 114, E is added to L. In the next step, 116, $V_{next}$ is defined as a vertex on the opposite side of V with respect to E. In step 118, $E_{next}$ is defined as a line which is closest to E in the clockwise direction among lines having $V_{next}$ as their start point or end point. In the next step, 120, $V_{next}$ is substituted for V, and, in step 122, $E_{next}$ is substituted for E. Step 122 returns to step 104.

In step 124 (FIG. 5), L is added to R, and, in step 126, L is cleared.

In the next step, 128, a line whose forward or backward flag is 0 is detected from the input line lists. In step 130, it is determined whether a line list exists whose forward or backward flag is 0. If it is determined that a line list exists whose forward or backward flag is 0, in step 132, the line data whose forward or backward flag is 0 among the input line lists will be assumed to be E. In the next step, 134, it is determined whether the forward flag of E is 0 or not. If, on the one hand, the forward flag of E is 0, in step 138, a start point will be substituted for V and step 138 will advance to step 104. If, on the other hand, the forward flag of E is not 0, an end point will be substituted for V and step 136 will advance to step 104. If, still further, it is determined in the step 130 that a line list whose forward or backward flag is 0 does not exist, this control will be terminated.

For R, all closed region lists are therefore obtained. That is, for example, as shown in FIG. 16(a), closed regions L01 to L25 are obtained as a closed region list by sequentially tracing the lines of the top view. In FIG. 16(a), the counterclockwise lists represent individual closed regions and the clockwise list represents a contour line including an adjacent closed region.

The details (FIG. 6) of step 200 will be described next. In this processing, the closed region list is converted to a tree structure by an inclusion (parent-child) relationship.

Figure 6:
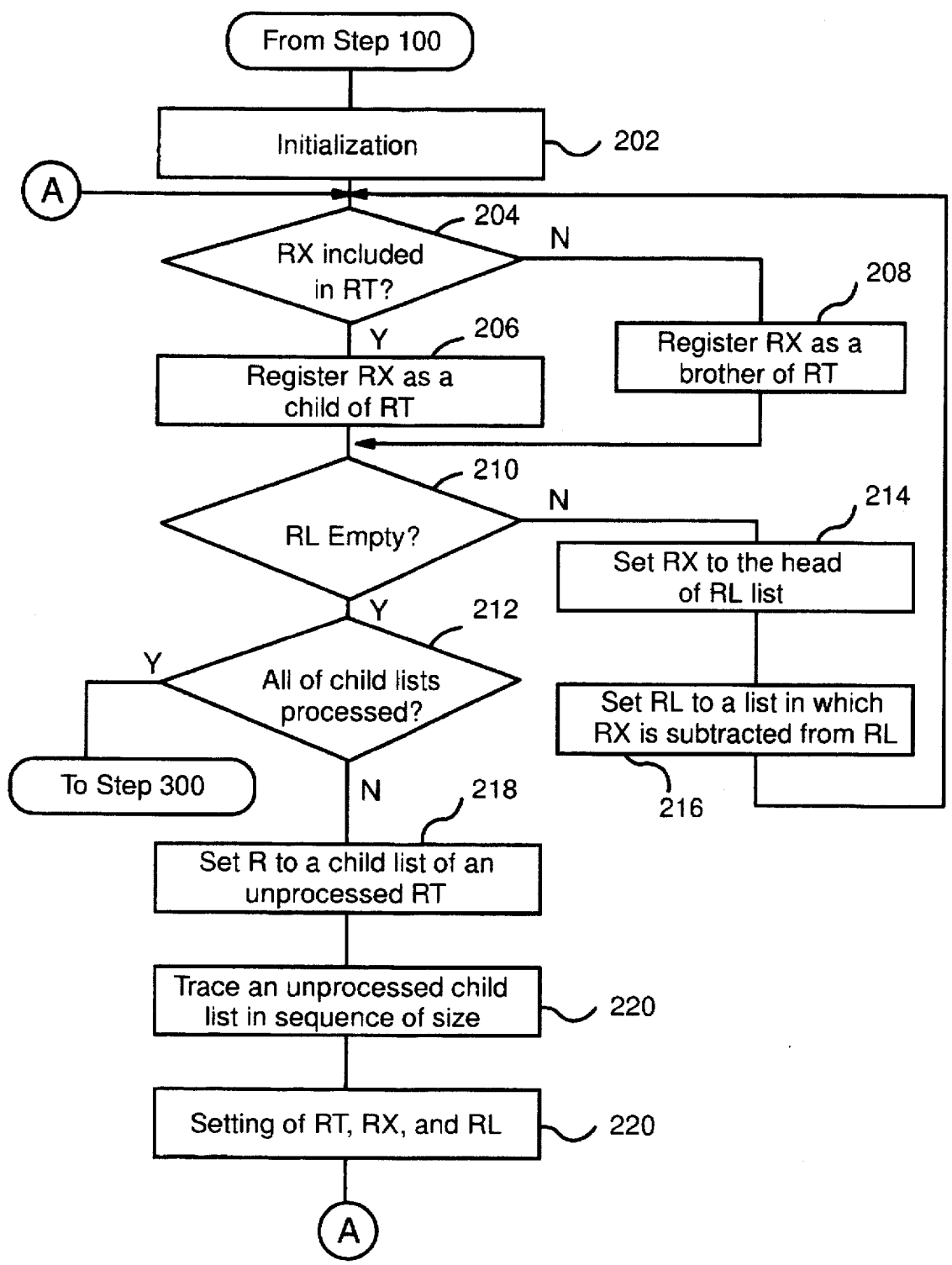
FIG. 6 is a flowchart for converting the closed region list into a tree structure.
Figure 7:
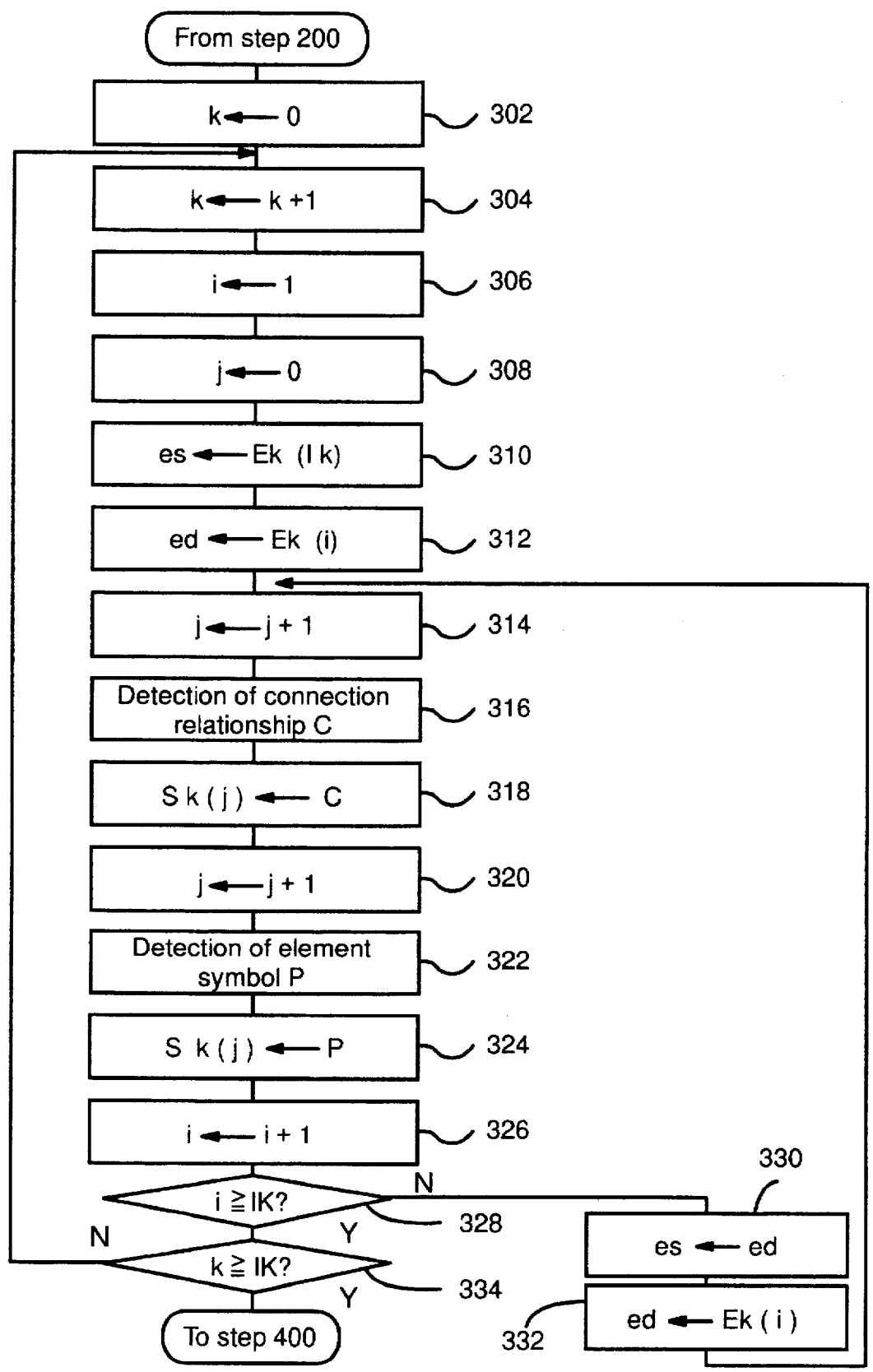
FIG. 7 is a flowchart showing a subroutine for symbol group conversion processing.
Figure 8:
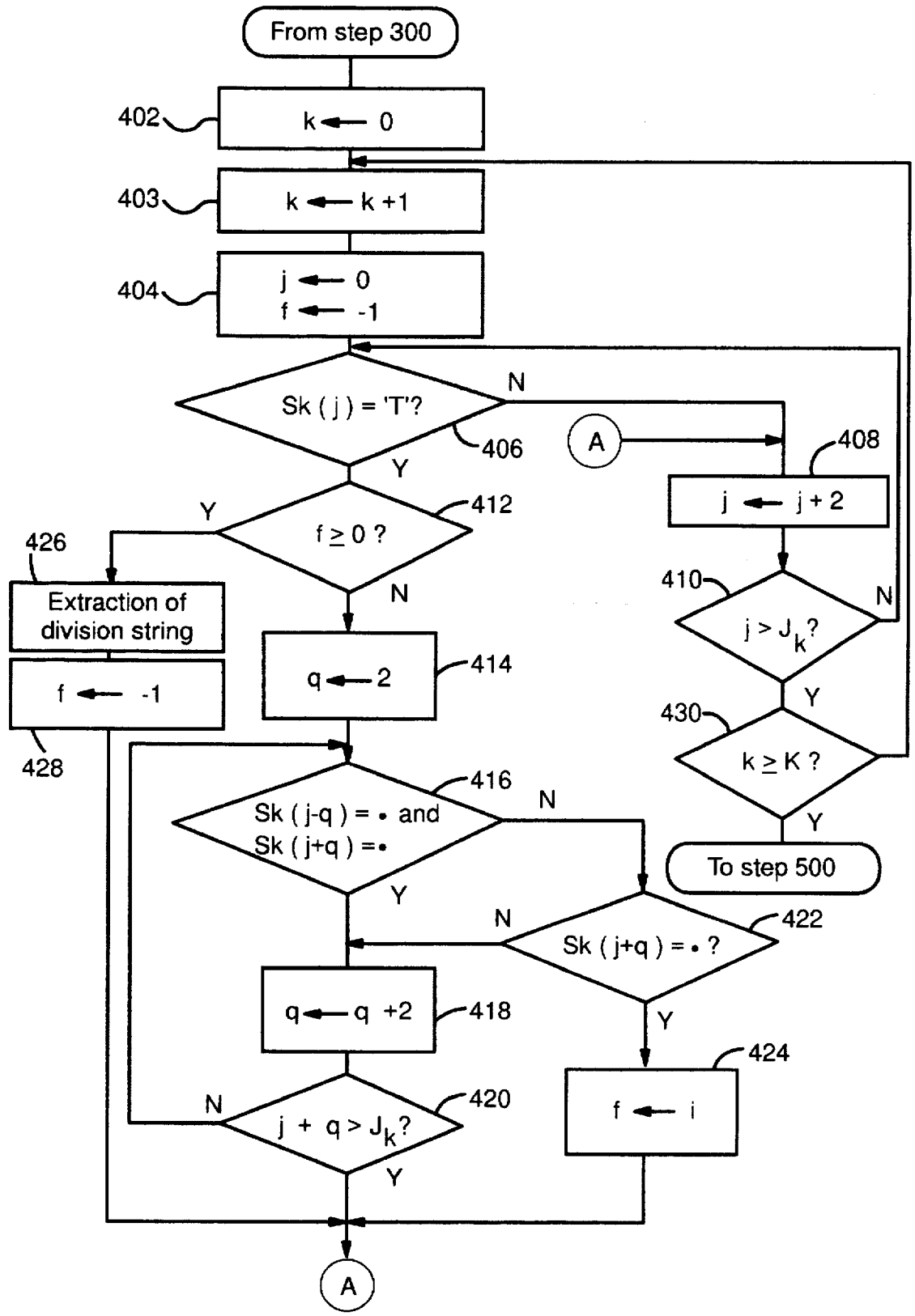
FIG. 8 is a flowchart showing a subroutine for symbol group division processing.
Figure 9:
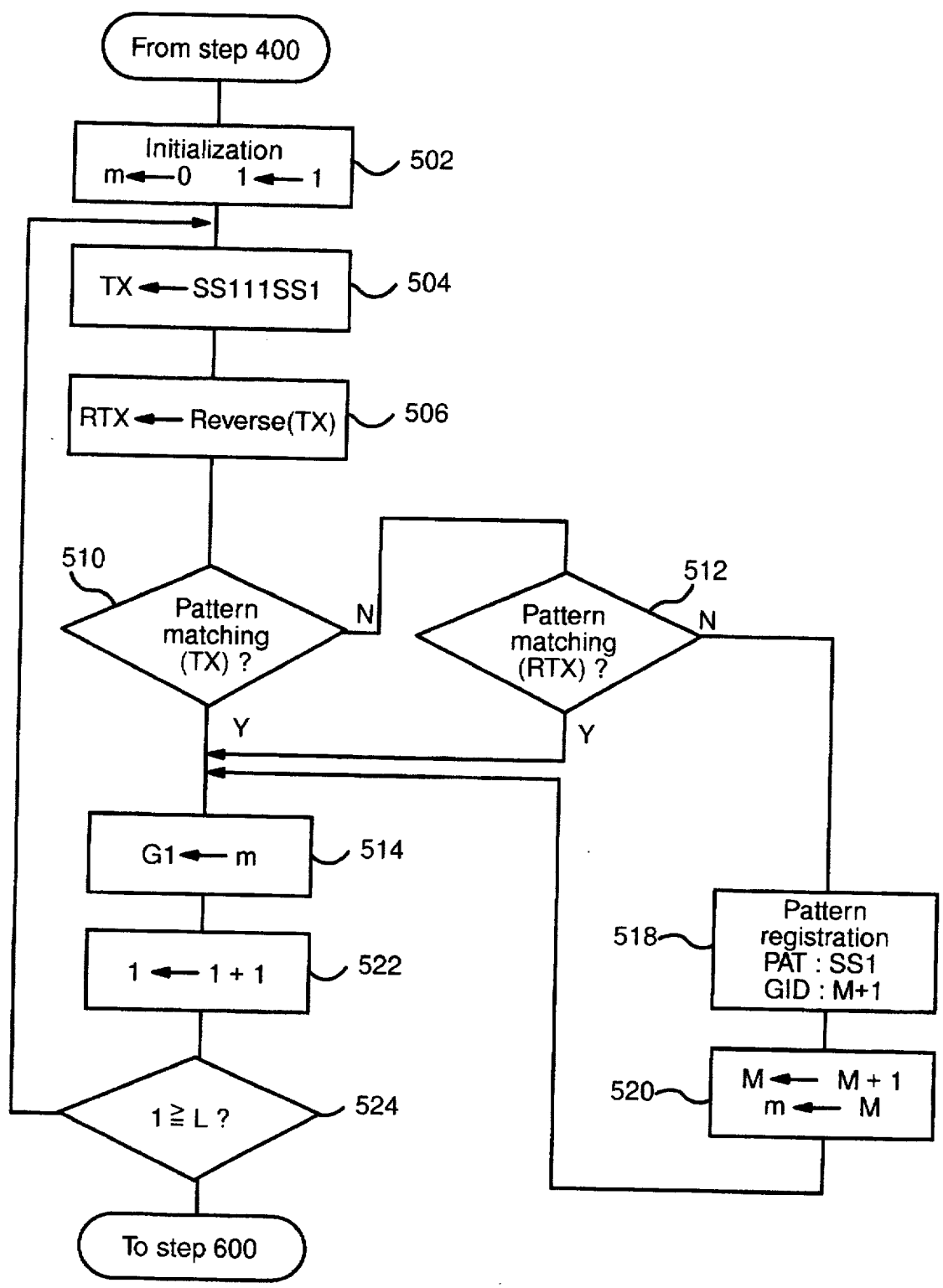
FIG. 9 is a flowchart showing a subroutine for symbol group matching processing.
Figure 10:
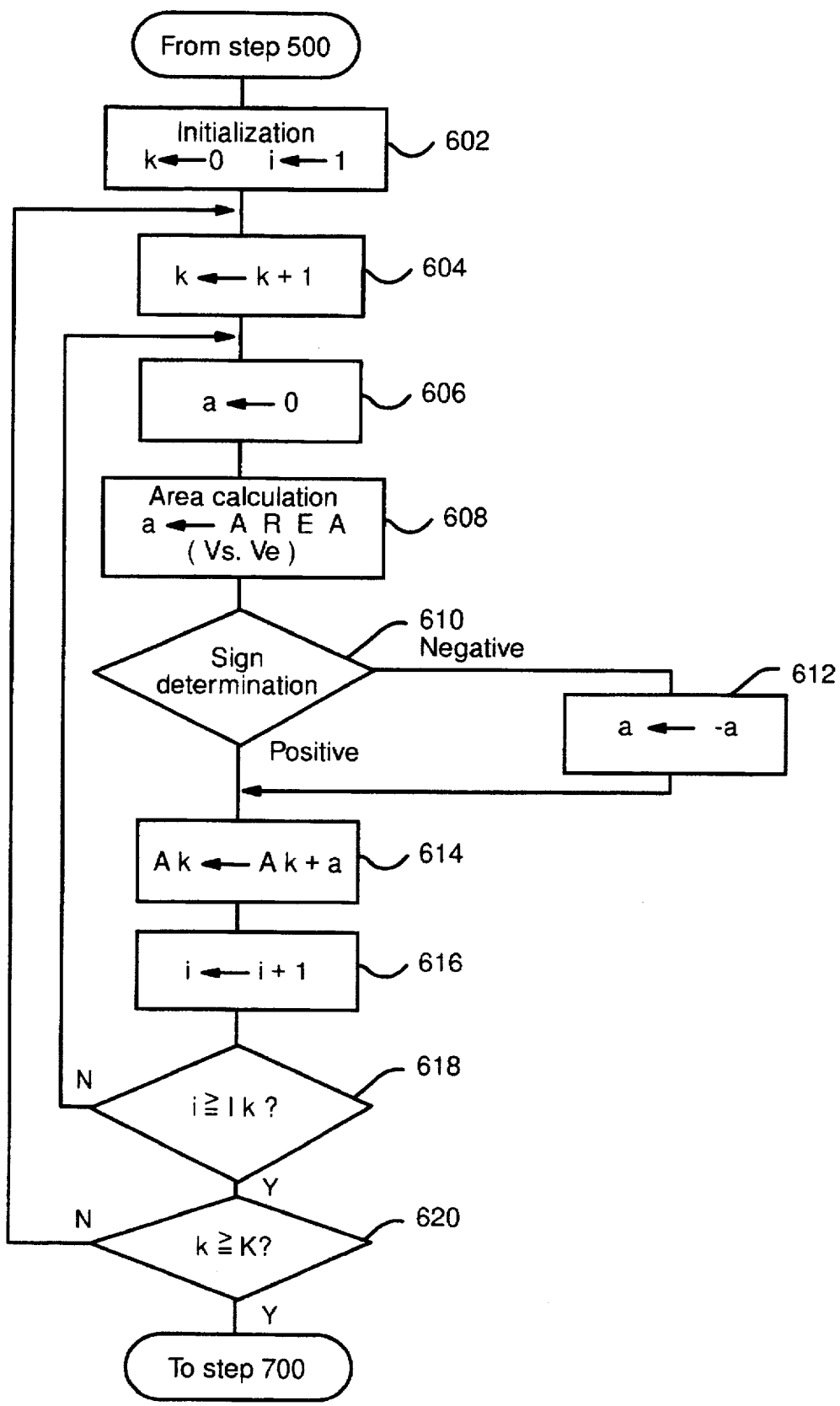
FIG. 10 is a flowchart showing a subroutine for attribute calculation processing.
Figure 11:
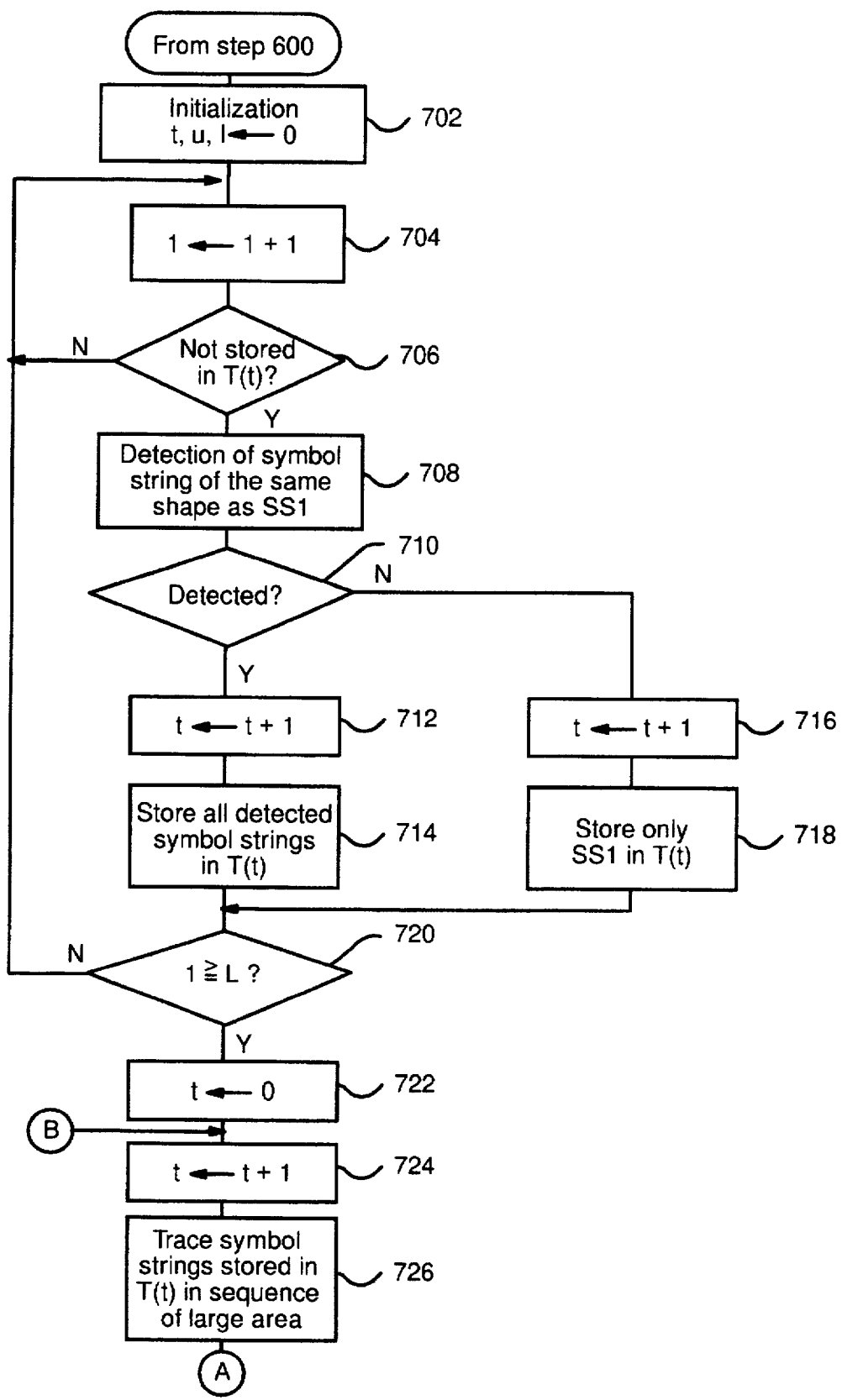
FIG. 11 is a flowchart showing part of a subroutine for closed region preliminary classification processing.

First, in step 202 shown in FIG. 6, with a boundary box containing R, R is initialized by tracing R in the sequence of size. The boundary box can be made by selecting the vertex on the lowermost left of x-y coordinates and the vertex on the uppermost right from among the vertexes of the lines constituting R. Also, the size is expressed by the length of the line connecting the vertexes of the opposite angles of the boundary box. In R, closed region lists $R_0, R_1, R_2, \ldots$ are arranged in the sequence of size, starting with the largest, and $R_0$ is substituted for RT as the initialization of a tree. Also, $R_1$ has been substituted for RX as the head of the list. Further, RL is assumed to be the remaining closed region lists $R_2, \ldots$.

In the next step, 204, it is determined whether RX is included in RT or not. If, on the one hand, RX is included in RT ("YES"), in step 206, RX will be registered as a child of RT. If, on the other hand, RX is not included in RT, in step 208, RX will be registered as a sibling of RT. In the next step 210, it is determined whether RL became empty or not. If, on the one hand, it is determined that RL does not become empty ("NO"), in step 214, RX will be set to the head of the RL list. In the next step, 216, RL is set to a list in which RX was subtracted from RL. Step 216 then returns to step 204.

If, on the other hand, it is determined in step 210 that RL becomes empty, it will be determined in step 212 whether the processing for all child lists has been complete or not. If the processing of all child lists has been completed, step 212 will advance to step 300. If the processing for all child lists has not been completed ("NO"), step 212 will advance to step 218. In step 218, R is regarded as an unprocessed child list of RT. In the next step, 220, the unprocessed child lists are traced in the sequence of size. Further, in step 222, the first child list, the second child list, and the remaining child lists are substituted for RT, RX, and RL, respectively. Step 222 returns to the step 204.

Figure 17:
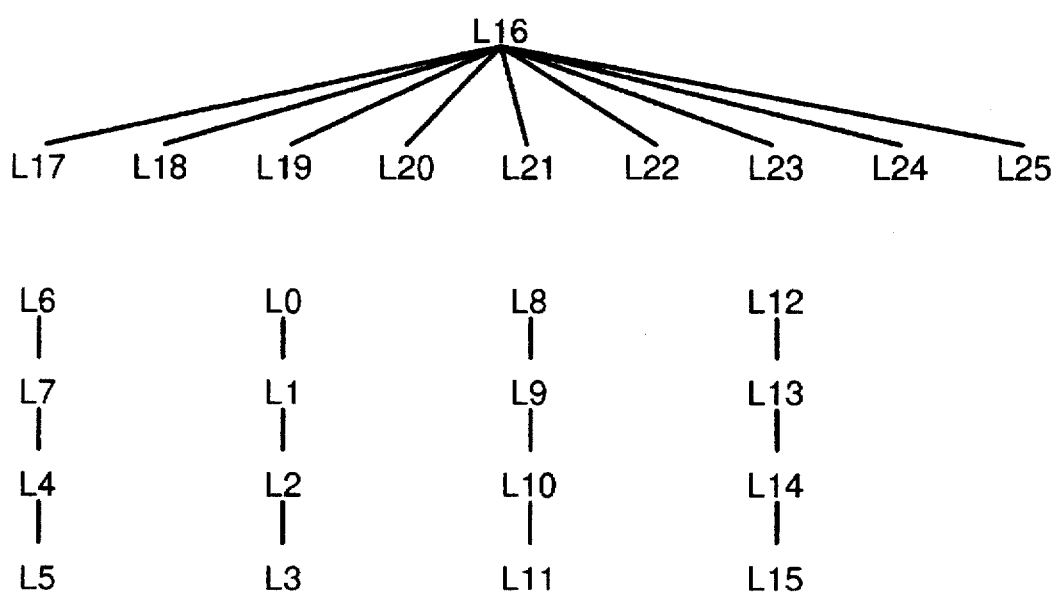
FIG. 17 is a diagram showing a tree structure of the detected regions.

The foregoing processing obtains closed region data which comprises IDs of closed regions, element ID lists, and dependent closed region ID lists. Since the dependent closed region ID list represents the inclusive relationship between the closed regions, the lists as a whole represent a tree structure. That is, for example, a tree structure (parent-child relationship) of closed regions L01 to L25 is obtained, as shown in FIG. 17.

The details (FIG. 7) of step 300 will be described next. In this processing, as described above, the closed region lists are converted to a plurality of symbol groups, each of which is a set of first symbols representative of an element of the contour line of a closed region and second symbols each representative of a connection relationship between the elements.

The first symbol will be described. Different symbols are used as the first symbol in different elements. More particularly, a line, a counterclockwise circular arc, and a clockwise circular arc are used as elements, and the symbols shown in Table 1 are applied to elements.

TABLE 1

| Element | Symbol |
|---|---|
| Line | I |
| Circular arc (counterclockwise) | ) |
| Circular arc (clockwise) | ( |

In this embodiment of the present invention, three types of element, consisting of a line, a counterclockwise arc, and a clockwise arc, are employed because, in the usual engineering drawing based on a right-angled projectile technique, most of the elements constituting the contour line of a closed region are lines and circular arcs. The circular arc used herein is expressed by center coordinates, a radius, a start point angle, and an end point angle, as described above. The circular arc is counterclockwise when start point angle<end point angle and clockwise when start point angle>end point angle. The maximum value of the center angle of a circular arc is 90°. A circle is therefore expressed by four circular arcs (arcs whose center angle is a maximum angle (90°)). The reason that a circular arc is employed where the maximum value of the center angle is 90° is that, in the above-described engineering drawing, in addition to expressing a circular, most corners can be expressed by a quarter of a circle.

The second symbol will be described next. As a second symbol, different symbols are employed in different connection relationships. This second symbol is defined as a connection relationship between one element and another element by symbolizing a change $\Delta T$ in angle between the tangents before and after a connection point, as shown in Table 2. The change $\Delta T$ is obtained by the following equation (1):

$$\Delta T = \tan^{-1} Ebegin_{i+1} - \tan^{-1} Eend_i \qquad (1)$$

where $\tan^{-1} Ebegin_{i+1}$ is the start point angle $\theta_s$ of an element constituting the contour line and $\tan^{-1} Eend_i$ is the end point angle $\theta_e$ of another element connected to the above-described element.

TABLE 2

| Connection relationship | Symbol |
|---|---|
| $\Delta T = 0$ | . |
| $0 < \Delta T < \pi/2$ | 1 |
| $\Delta T = \pi/2$ | > |
| $\pi/2 < \Delta T < \pi$ | L |
| $0 > \Delta T > -\pi/2$ | r |
| $\Delta T = -\pi/2$ | < |
| $-\pi/2 > \Delta T > -\pi$ | R |
| $\Delta T = \pi$ | T |

The reason that the change $\Delta T$ in angle between the tangents before and after the connection point between a contour line and another contour line is symbolized at right angles is that, in the above-described engineering drawing, contour lines are often connected at an angle of 90°. That is, this is because it is general that normal mechanical parts are worked or assembled based on right angles.

In step 300, the closed region lists are converted to symbol groups by using such first and second symbols.

That is, in step 302, a variable k for identifying each of the closed region lists is set to 0 and, in step 304, the variable k is incremented by 1. In step 306, a variable i for identifying drawing data constituting the closed region list $E_k$ identified by the variable k is set to 1, and a variable j for identifying the storage position of a storage region $S_k$ for storing the above-described first and second symbols is set to 0.

In step 310, the end drawing data $E_k(I_k)$ Of the closed region list $E_k$ identified by the variable k is stored in a variable es and, in step 312, the ith drawing data $E_k(i)$ of the closed region list $E_k$ identified by the variable k is stored in a variable ed. $I_k$ used herein represents the number of elements of the closed region list $E_k$.

In step 314, the variable j is incremented by 1. In step 316, a connection relationship C between the variables es and ed is detected based on the above-described equation (1). In step 318, the connection relationship C is stored in the jth storage position of the storage region $S_k$.

In step 320, the variable j is incremented by 1. In step 322, the element symbol P of the variable ed is detected. In step 324, the element symbol P is stored in the jth position of the storage region $S_k$.

In step 326, the variable i is incremented by 1, and, in step 328, it is determined whether or not the variable i is equal to or greater than the number $I_k$ for identifying the end drawing data of the drawing data constituting the closed region list $E_k$ identified by the variable k. If on the one hand, the variable i is not equal to or greater than the number $I_k$ ("NO"), in step 330, the variable ed will be substituted for the variable es and the ith drawing data $E_k(i)$ will be substituted for the variable ed, because the symbol of the connection relationship and the element symbol have not been detected. Step 332 returns to step 314, in which the above-described processing (steps 314 to 328) is repeated. If, on the other hand, the variable i is equal to or greater than the number $I_k$, step 328 will advance to step 334, because all connection relationship symbols and element symbols of the closed region list $E_k$ identified by the variable k have been detected.

In step 334, it is determined whether or not the variable k is equal to or greater than the number of all closed region lists, K. If, on the one hand, the variable k is less than K, step 334 will return to step 304 and the above-described processing (steps 304 to 334) will be repeated, because the connection relationship symbol and the element symbol have not been detected. If, on the other hand, the variable k is equal to or greater than K, this processing will be terminated because the connection relationship symbol and the element symbol have been detected for all drawing data of the closed region lists.

If the closed region list $E_k$ (i) is thus converted to the symbol group $S_k$ with the first and second symbols, the symbol group $S_{18}$(j) of the closed region 18 among the closed regions L01 to L25 on the top view shown in FIG. 16, for example, will be as follows:

$S_{18}$(j)=▷▷▷▷▷▷ⅠΤΙ.▷▷Ⅰ.ΙΤ

Thus, the data constituting the symbol group $S_k$(j) become data in which the first and second symbols are alternately arranged.

As the types of data obtained in this stage, there is a plurality of data (first symbols and second symbols) constituting a plurality of symbol groups $S_k$, the number of elements of each of the symbol groups $S_k$ (total of first symbols, and ID of the symbol groups $S_k$ of closed regions each including a closed region corresponding to each of the symbol groups $S_k$. The ID of the symbol group corresponds to $S_k$.

The details (FIG. 8) of step 400 will be described next. As described above, this processing determines whether the converted symbol groups have a symbol group having a specific symbol T representative of a specific connection relationship between contour lines and, when there is the symbol group having a specific symbol T, divides that symbol group into a plurality of symbol groups, based on that specific symbol T.

The symbol T used herein indicates that the connection relationship between one element and another element of the contour lines of a closed region is $\Delta T=\pi$. That is, as shown in FIG. 16, the symbol T represents the portion of an contour line Z1, Z2, Z3, or Z4 which does not connect anywhere and which is folded back. Such portions Z1 to Z4 are a portion in which two regions are smoothly connected three-dimensionally, and are produced by the reason that on a plan view a line is not drawn between the two regions. Then, based on the symbol T representative of a specific relationship such as the portions Z1 to Z4, a closed region is divided to write a contour line (division line) originally existing between the two regions.

More particularly, in step 402, initialization is performed. That is, the variable k for identifying each of symbol groups is set to 0, and, in the next step, 403, the variable k is incremented by 1. In step 404, the variable j for identifying the symbol of the symbol group $S_k$ identified by the variable k is set to 0 and the flag f is set to −1.

In step 406, it is determined whether or not the jth symbol $S_k$(j) of the symbol group $S_k$ is the above-described T. It is to be noted that, since at this stage the variable j is 0, the determination in the step 406 is "NO" and the step 406 will advance to step 408.

As described above, the symbol group $S_k$ begins with the first symbol, the first symbol and the second symbol are alternately arranged, and the second symbol is stored in the positions of the symbol group $S_k$ bearing even numbers. Therefore, since the variable j begins with 0, in step 408 the variable j is incremented by 2 for reading out the second symbol. In the next step, 410, it is determined whether or not the variable j is greater than the total number $J_k$ of symbols of the symbol group $S_k$. At this point, the variable j is 2, so the determination in step 410 is "NO" and step 410 returns to step 406. In step 406, it is again determined whether or not the jth symbol of the symbol group $S_k$(j) is the above-described T. If the foregoing processing (steps 406 to 410) is repeated and the determination in step 406 is YES, step 406 will advance to step 412. In step 412, it is determined if the flag f is equal to or greater than 0. At this point, the flag f has been set to −1, so the determination in step 412 is NO and, in step 414, the variable q is set to 2. In step 416, it is determined whether or not the symbol which is q symbols before the jth symbol is "." and also the symbol which is q symbols after the jth symbol is ".". If YES, in step 418, the variable q will be incremented by 2. In step 420, it is determined whether or not j+q>the total $J_k$ of symbols of the symbol group $S_k$. If, on the one hand, the determination is NO, step 420 will return to step 416. In step 416, the foregoing processing (steps 416 to 420) is repeated.

If, on the other hand, the determination in step 416 is NO, in step 422 it will be determined whether or not the symbol $S_k$(j+q), which is q after the jth symbol, is ".". If on the one hand, NO, step 422 will advance to step 418. If, on the other hand, YES, in the closed region L18 shown for example in FIG. 16, between the portions Z1 and Z2 where the contour lines do not connect anywhere and also are folded back, the start point Z2, which gets into a region (portion indicated by arrow Z2→Z1) that is desired to be divided, will be detected. In step 424, the flag is set to 1. Step 424 advances to step 408.

Thereafter, if steps 408, 410, and 406 are repeated, the data of the symbol group $S_k$(j) identified by the variable j will identify the second T symbol detected in step 422. Therefore, the determination in step 406 becomes YES and, in step 412, it is determined whether or not the flag f is equal to or greater than 0. Since, in step 424, the flag f has been set to 1, this T symbol is determined to be the end point of a region that is desired to be divided. Step 412 advances to step 426.

In step 426, a division string is extracted. That is, since the above-described symbol group $S_{18}$(i) of the closed region L18 is $S_{18}$(j)=▷▷▷▷▷▷ⅠΤΙ.▷▷Ⅰ.ΙΤ, the symbol group between the two symbol Ts is extracted as a new symbol group. This is obtained by replacing the symbol "T" with a symbol group "?!?". The "!" in the "?!?" indicates that the symbol T and the symbol T are connected by a line, and the symbol "?" indicates that the angles before and after the line are unclear. Therefore, the symbol group $S_{18}$(i) becomes $S_{18}$(i)=▷▷▷▷▷▷|?!?. Also, a newly generated symbol group $S_{26}$(i) becomes $S_{26}$(i)=I.▷▷I.I?!?.

In step 428, the flag f is set to −1 and step 428 advances to step 408. If the foregoing processing (steps 406 to 428) is repeated and the detection of the symbol T and the extraction of the division string are performed for all second symbols of the symbol group $S_k$(j) identified by the variable k, the determination in step 410 will become YES and step 410 will advance to step 430. In step 430, it is determined whether or not the variable k is equal to or more than the number of all symbol groups, K. If, on the one hand, NO, step 430 will return to step 404 because the detection of the symbol T and the extraction of the division string have not been performed for all second symbols. In step 404, the foregoing processing (steps 404 to 430) is repeated. If, on the other hand, YES, this processing will be terminated because there is no symbol group where the detection of the symbol T and the extraction of the division string have not been performed for all second symbols.

Figure 16:
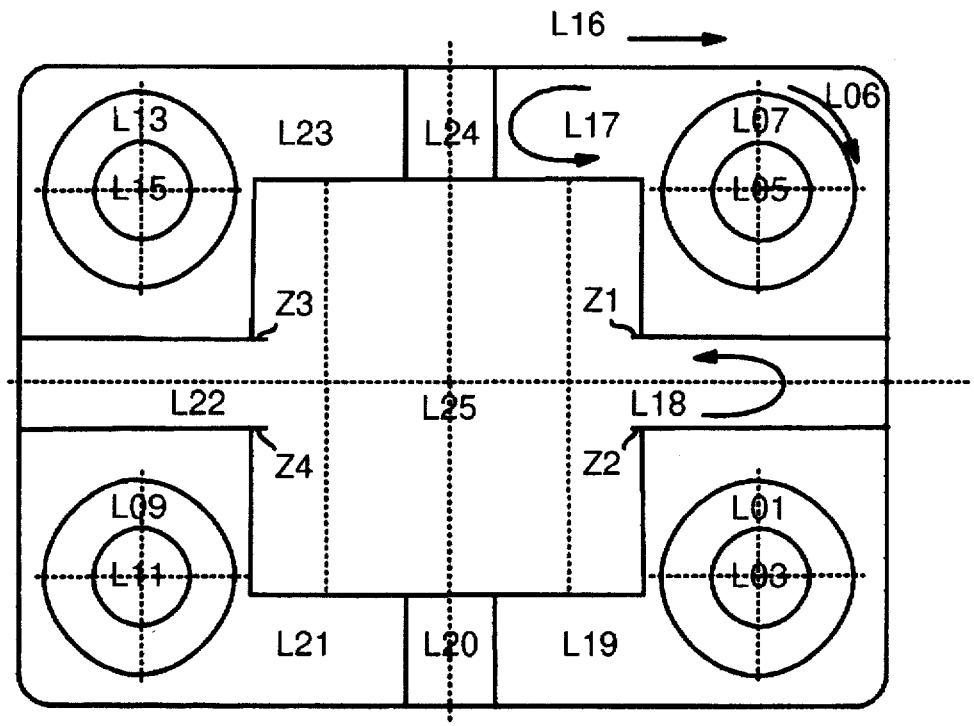
FIG. 16 is a diagram showing the closed regions detected from top view data.
Figure 18:
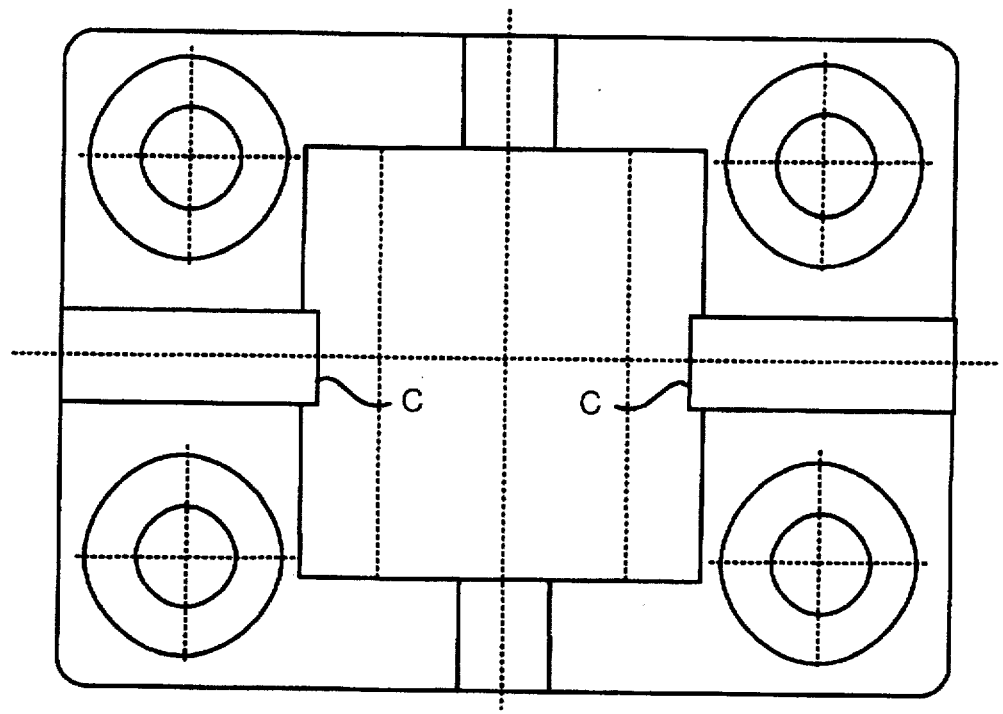
FIG. 18 is a top view in which division lines have been generated by dividing a symbol group.
Figure 19:
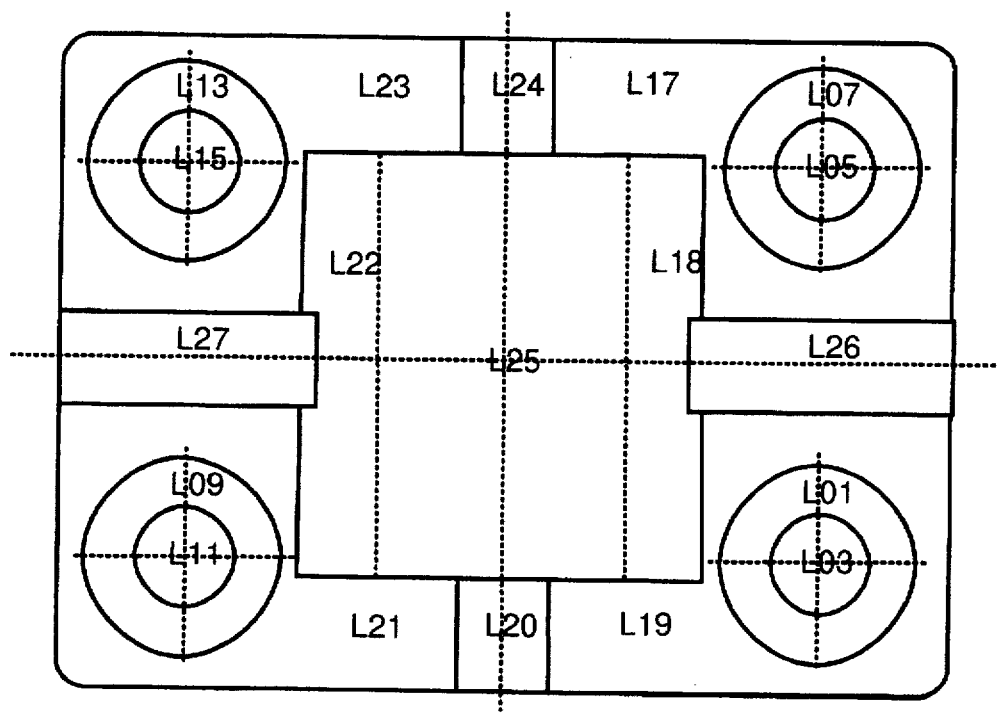
FIG. 19 is a top view showing the closed regions classified by the closed region preliminary classification.

Thus, for example, as shown in FIG. 16, the portions Z1 and Z2, in which the contour lines do not connect anywhere and also are folded back, are detected and the division string is extracted. Therefore, as shown in FIG. 18, the division line C is drawn between the portions Z1 and Z2. Also, as shown in FIG. 19, the closed region L18 is divided into a closed region L18 and a closed region L26. Likewise, the closed region L22 (FIG. 16) is divided into a closed region L22 and a closed region L27, as shown in FIG. 19.

Figure 24:
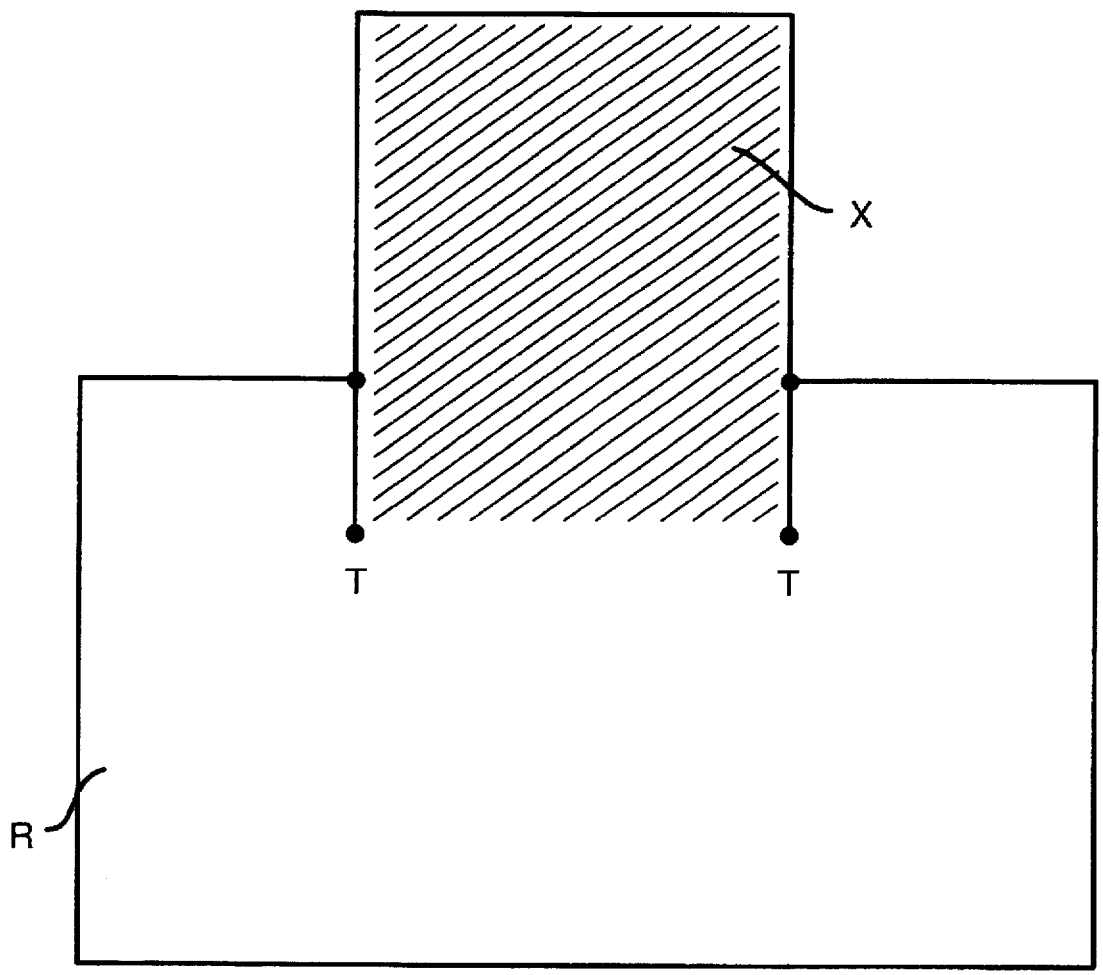
FIG. 24 is a diagram in which two different closed regions have been drawn as the same closed region.

The extraction of the division string will be further described. There are some cases in which, as shown in FIG. 24, a closed region X and a closed region R originally different from each other become the same region because a contour line is not drawn. In such case, the symbol group $S_X$ corresponding to the closed region X becomes $$S_x = T !.\triangleright\triangleleft !.T$$

Also, the symbol group $S_R$ corresponding to the closed region R becomes $$S_R = T \triangleright \triangleright \triangleright \triangleright \triangleright T$$

In this case, a closed region to be extracted is not the closed region R but the closed region X. While the symbol before and after the symbol T of the symbol group $S_X$ corresponding to the closed region X is ".", the symbol before and after the symbol T of the symbol group $S_R$ corresponding to the closed region R is ">" Therefore, a closed region to be extracted can be detected by determining (in step 416) whether the symbol before and after the symbol T is ".". In this way, the different closed region is extracted from the same region. In the above-described case, the symbol group $S_{26}(i)$ is extracted and the closed region L26 is extracted. Likewise, the closed region L27 is extracted.

Since there are some cases in which, after the processing in step 400 has been performed, the symbol group is divided and a new symbol group is generated, the symbol group $S_k$ will hereinafter be expressed as a symbol group $SS_L$ to discriminate it from the symbol group $S_k$ in step 400, and the total of the symbol groups $SS_L$ is assumed to be L.

The details (FIG. 9) of the step 500 will be described next. As described above, in this processing, the shape of a closed region is detected based on each of the symbol groups by using Aho-Corasik's algorithm. That is, a plurality of shape patterns (M patterns), each consisting of first symbols and second symbols, is stored in the work memory 24 and the shape of the symbol groups $SS_L$ is detected by matching each of the symbol groups $SS_L$ with the M shape patterns.

Also, m (1 to M) is assumed to be a variable (shape pattern ID) for identifying each of the M shape patterns stored in the work memory 24, and $G_L$ is assumed to be a storage region for storing shape pattern IDs corresponding to the symbol groups $SS_L$.

First, in step 502, initialization is performed. That is, a variable 1 is set to 1. In step 504, a symbol group $SS_L \| SS_L$ where two of the first symbol group $SS_L$ are connected is stored as text data in TX, and, in step 506, a symbol group where the data of the symbol group $SS_L \| SS_L$ is arranged in reverse is stored as reverse text data in RTX.

In step 510, matching between the text data TX and the shape pattern is performed. In matching, finite state automation is generated from the stored shape patterns and, when the text data TX has reached a certain node by transitioning the state of the finite state automation by reading the text data TX one symbol by one symbol, it is determined that the text data TX has been matched with the shape pattern. When, on the one hand, matching has succeeded, the shape pattern ID (1 to M) is assumed to be substituted for the variable m. When matching has succeeded, in step 514, the number of the variable m is stored in the storage region $G_L$, and the step 514 advances to step 522.

When, on the other hand, matching in step 510 has not succeeded, in step 512, matching between the text data RTX and the shape pattern is performed. If the text data RTX matches the shape pattern, step 512 will advance to step 514. If the matching in step 512 does not succeed, step 512 will advance to step 518. In step 518, since a shape pattern matching the symbol group $SS_L$ has not been stored in the work memory 24, that shape pattern is registered. That is, that symbol group $SS_L$ is stored in the work memory 24 and, at the same time, the ID (GID) of the stored symbol group $SS_L$ is set to M+1. In step 520, the total number M is incremented by 1 and M is substituted for m. Step 520 advances to step 514, in which M is substituted for the storage region $G_L$ of this symbol group.

In step 522, the variable 1 is incremented by 1 and, in step 524, it is determined whether or not the variable 1 is equal to or greater than the total number of the symbol groups $SS_L$, L. If, on the one hand, the variable it is less than this number (NO), the step 524 will return back to the step 504 and the foregoing processing (steps 504 to 524) will be performed, because there are symbol groups $SS_L$ for which the matching with shape patterns has not been performed. If, on the other hand, the variable 1 is equal to or greater than the total number of the symbol groups $SS_L$, L, this processing will be terminated because there is no symbol group $SS_L$ for which the matching with shape patterns has not been performed.

Thus, when the symbol group matches all shape patterns stored in advance, that symbol group is registered as a new shape pattern, so a new symbol group that does not match with a stored shape pattern can be coped with and also matching can be performed reliably.

The details (FIG. 10) of step 600 will be described next. In this processing, the area of a closed region is calculated based on the closed region list $E_k$.

First, in step 602, initialization is performed. That is, a variable k for identifying the closed region list $E_k$ is set to 0, and a variable i for identifying the data of one element of the closed region list $E_k$ that is identified by the variable k is set to 1. In step 604, the variable k is incremented by 1, and, in step 606, a storage region a is set to 0.

In step 608, area calculation is performed. That is, based on the data of the ith element of the closed region list $E_k$ identified by the variable k, the area of a triangle defined by the line of that element and the lines between the opposite ends Vs (start point) and Ve (end point) of that element and the origin is calculated, and the obtained area is stored in the storage region a.

In step 610, a determination of sign is performed. That is, the angles defined when the start point Vs and the end point Ve which are the opposite points of the line of the ith element are connected to the origin are assumed to be $\theta_s$ and $\theta_e$, and it is determined whether or not $\theta_e - \theta_s$ is a positive value, i.e., the start point $\theta$s is smaller than the end point $\theta_e$. If $\theta_e - \theta_s$ is a positive value, step 610 will advance to step 614. If $\theta_e - \theta_s$ is a negative value, in step 612, a multiplied by −1 will be assumed to be a and step 612 will advance to step 614. In step 614, the value of a is added to the area $A_k$ of the kth closed region, and the resultant value is regarded as the area $A_k$ of the kth closed region.

In step 616, the variable i is incremented by 1, and in step 618, it is determined whether or not the variable i is equal to or greater than the total number of elements constituting the contour line of the kth closed region list $E_k$, $I_k$. If, on the one hand, the variable i is smaller than the total number $I_k$, step 618 will return to step 606 and the foregoing processing (steps 606 to 618) will be repeated, because the calculation of the area of the kth closed region has not been completed.

If, on the other hand, the variable i is equal to or greater than the total number $I_k$, step 618 will advance to step 620, because the calculation of the area of the kth closed region has been completed. In step 620, it is determined whether or not the variable k is equal to or greater than the total number of the closed region lists, K. If, on the one hand, the variable k is smaller than the total number K, step 620 will return back to step 604 and the foregoing processing (steps 604 to 620) will be repeated, because there is a closed region where the area calculation has not been completed. If, on the other hand, the variable k is equal to or greater than the total number K, this processing will be terminated because the area calculation has been completed for all closed regions.

Thus, the area of the triangle defined by the line of an element and the lines between the opposite ends (start point and end point) of the element and the origin is calculated, the area obtained by performing the sign determination of whether the start point angle is smaller than the end point angle is regarded as a negative value when the start point angle is greater than the end point angle, the obtained area is regarded as a positive value when the start point angle is smaller than the end point angle, and the areas obtained for all elements are added. Therefore, the area of a closed region can be obtained.

The details (FIG. 11) of step 700 will be described next. This processing classifies, from a plurality of symbol groups, symbol groups of closed regions of the same shape and further classifies (preliminary classification of closed regions), from the symbol groups of closed regions of the same shape, symbol groups of closed regions of the same area.

The reason that the symbol groups consisting of the same symbol groups are further classified into symbol groups where the closed regions are the same area is that even the symbol groups consisting of the same symbol groups are often different in shape. For example, when a closed region is a circle, the symbol group is constituted by ).).).)., and when a closed region is a rectangle, the symbol group is constituted by |>|>|>|>. However, since a difference size is not expressed in them, an error will occur in the classification. Also, even if symbol groups were the same symbol groups, an error in classification would be eliminated if symbol groups can be classified by area.

First, in step 702, initialization is performed. That is, a variable t for identifying a storage region T(t), a variable u for identifying a storage region U(u), and a variable l for identifying the symbol group $SS_L$ are set to 0.

In step 704, the variable l is incremented by 1, and, in step 706, it is determined whether or not the lth symbol group $SS_L(j)$ is not stored in T(t). If, on the one hand, the determination is step 706 is NO, step 706 will return to step 704 and steps 704 and 706 will be performed, because the lth symbol string $SS_L(j)$ has already been classified. If, on the other hand, the determination in step 706 is YES, since the lth symbol string $SS_L(j)$ Of the lth symbol group has not been classified, a symbol group having the same shape (same symbol string) as the lth symbol group $SS_L$ among the symbol groups $SSL_{l+1}$ to $SS_L$ is detected in step 708. The detection of the symbol group having the same shape (same symbol string) as the symbol group $SS_L$ is performed by detecting a storage region in which the same ID as the shape pattern ID stored in the storage region $G_L$ corresponding to the symbol group $SS_L$ is stored.

In step 710, it is determined whether or not a symbol group having the same shape (same symbol string) as the symbol group $SS_L$ has been detected. If, on the one hand, YES, in step 712, the variable t is incremented by 1, in step 714, all of the detected symbol groups are stored in T(t), and step 714 advances to step 720. If, on the other hand, NO, in step 716, the variable t is incremented by 1, in step 718, only the symbol group $SS_L(j)$ is stored in T(t), and step 718 advances to step 720.

In step 720, it is determined whether or not the variable l is equal to or greater than the total number of the symbol groups, L. If, on the one hand, NO, since there are symbol groups that have not been classified, step 720 will return to step 704 and the foregoing processing (steps 704 to 720) will be repeated. If, on the other hand, YES, all symbol groups will be classified. If, on the one hand, as the result of the foregoing processing (steps 704 to 720), the symbol groups $SS_1$ to $SS_L$ are classified into symbol groups of closed regions of the same shape and into symbol groups of closed regions different from each other. On the other hand, since the symbol groups of closed regions of the same shape are groups of the same shape but some of them are different in area, they are further classified into symbol groups of closed regions of the same area and into symbol groups of closed regions different in area from each other.

Figure 12:
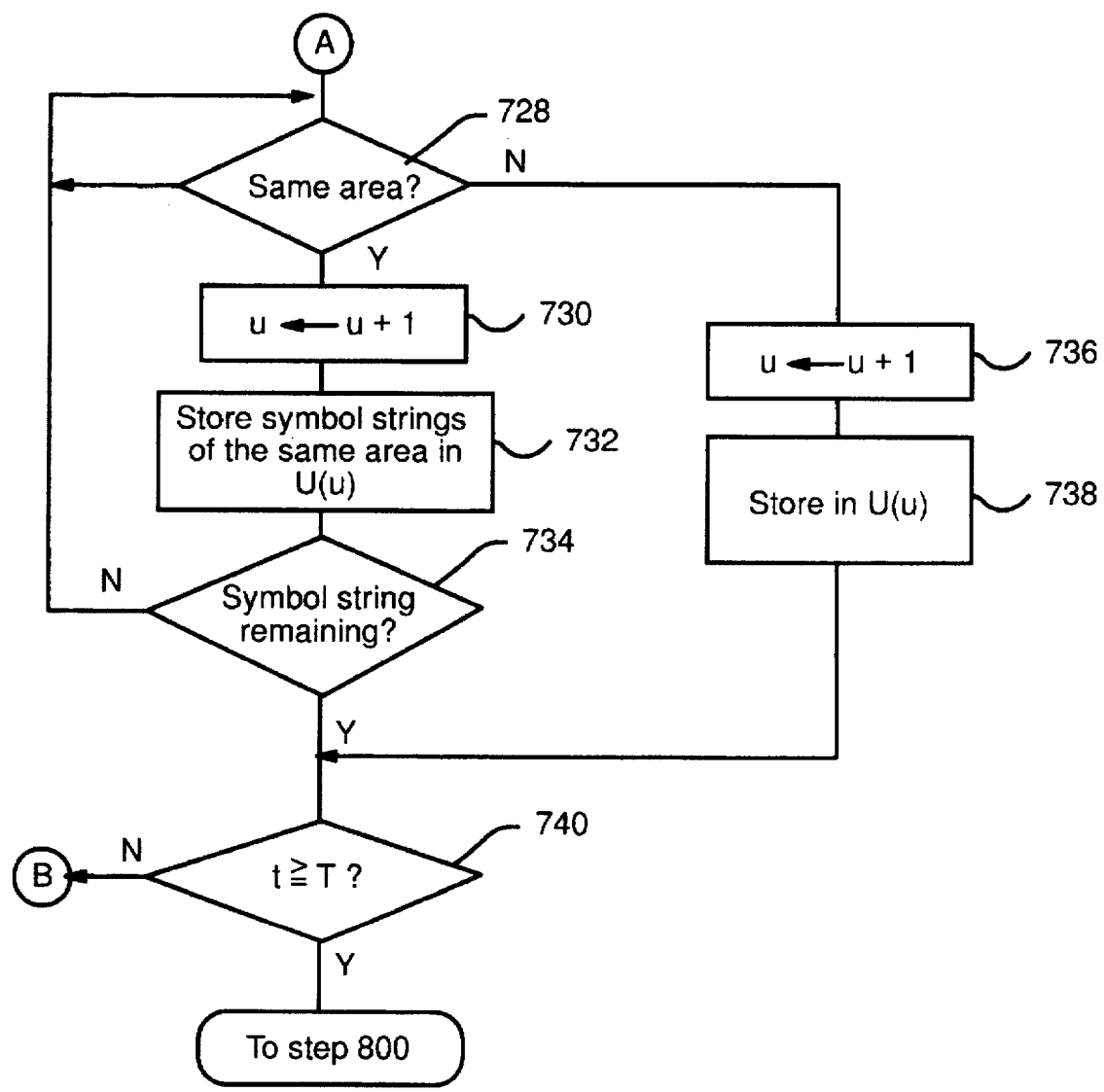
FIG. 12 is a flowchart showing the remainder of the subroutine for closed region preliminary classification processing.
Figure 13:
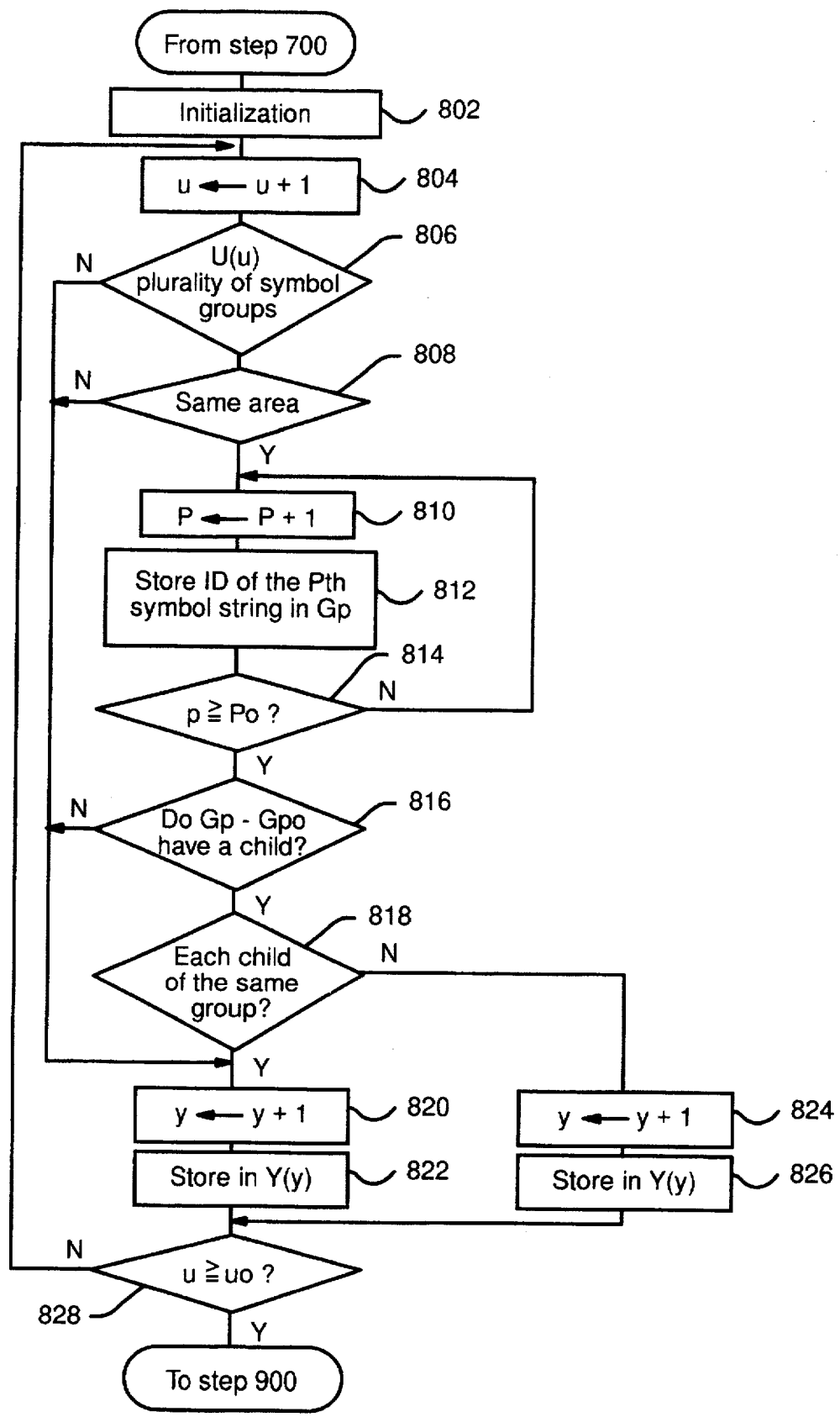
FIG. 13 is a flowchart showing a subroutine for closed region subclassification.
Figure 14:
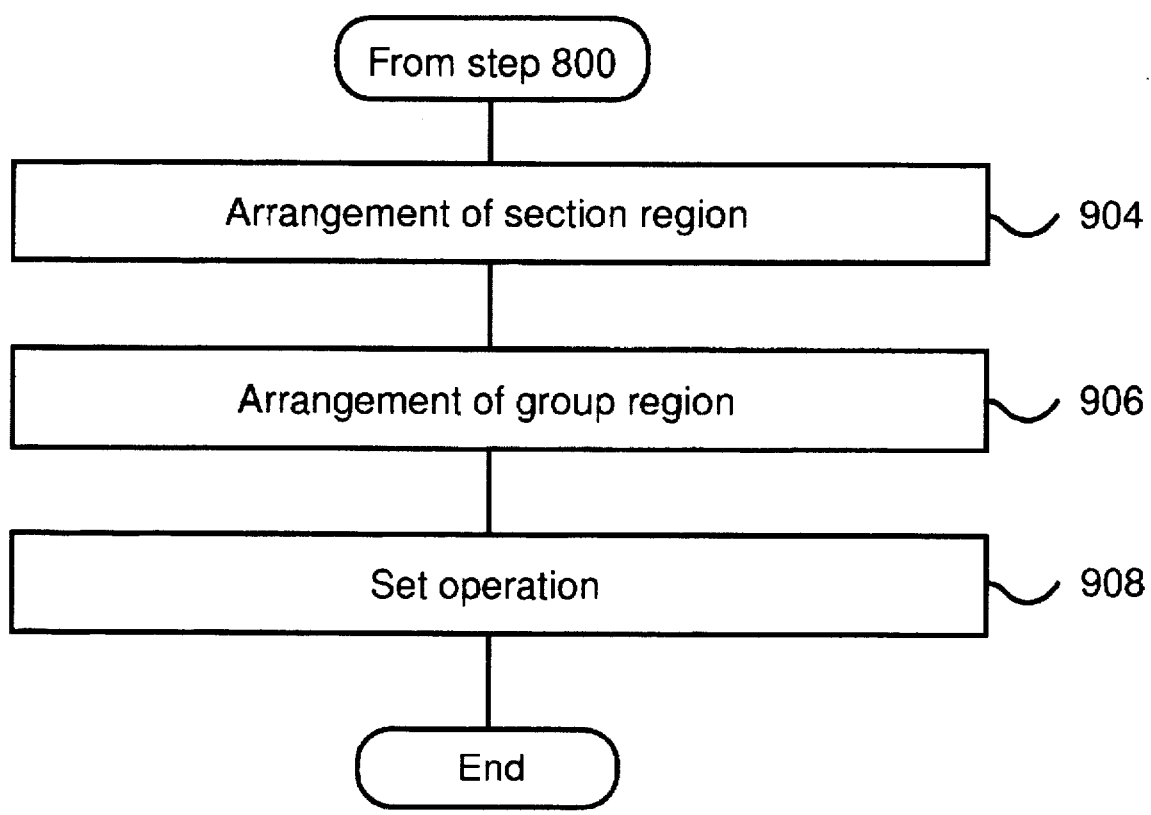
FIG. 14 is a flowchart showing a subroutine for synthesis of a solid model.

More particularly, in step 722, the variable t is again set to 0, and, in step 724, the variable t is incremented by 1. In step 726, the symbol groups stored in T(t) are traced in order of large area, and step 726 advances to step 728 (FIG. 12).

In step 728, it is determined whether or not the symbol groups stored in T(t) have symbol groups of the same area. If YES, in step 730, the variable u for identifying the storage region U(u) is incremented by 1, and, in step 732, the symbol groups of the same area are stored in the storage region U(u). Therefore, the symbol groups of the same shape and the same area are stored in a single storage region U(u).

In step 734, it is determined whether or not the remaining symbol groups are in T(t). If NO, step 734 will return to step 728, in which it is determined if there are symbol groups of the same area. If, on the one hand, the determination in step 728 is YES, steps 730 and 732 will be performed and the symbol groups of the same area will be stored in the storage region U(u).

If, on the other hand, the determination in step 728 is NO, in step 736 the variable u will be incremented by 1 and in step 738 the symbol groups will be stored in U(u). Therefore, the symbol groups of the same shape but different areas are stored in a single storage region U(u).

In step 740, it is determined whether or not the variable t is equal to or greater than the total number of the storage regions T(t), T. If, on the one hand, NO, step 740 will return to step 724 and the foregoing processing (steps 724 to 740) will be repeated, because there is the storage region T(t) that has not been preliminary-classified. If, on the other hand, YES, this processing will be completed because all the symbol groups stored in the storage regions T(t) have been preliminary-classified.

As the result of the foregoing processing, the symbol groups $SS_1$ to $SS_L$ are classified into a plurality of groups (first groups) of an equivalent relationship such as the same shape and same area relationship. At this time, a closed region which does not have an equivalent relationship such as the same shape and same area relationship with other closed regions is classified into one group (second group) of a single closed region. In FIG. 19, the closed regions L03, L05, L11, and L15, the closed regions L01, L07, L09, and L13, the closed regions L17, L19, L21, and L23, the closed regions L20 and L24, the closed regions L26 and L27, the closed regions L18 and L22, and the closed region L25 form different groups, respectively. Particularly, since the closed region L25 does not have an equivalent relationship such as the same shape and same area relationship with other closed regions, it forms a single group (second group) comprising one closed region.

The details (FIG. 13) of step 800 will be described next. This processing further classifies, from the symbol groups belonging to the first group, a symbol group of closed regions in which the closed regions corresponding to the symbol group belonging to the first group have as a child a closed region of the same shape and the same area.

First, in step 802, initialization is performed. The variable u for identifying the storage region U(u), and a variable P for identifying the symbol groups stored in the storage region U(u) identified by the variable u are set to 0. In the next step, 804, the variable u is incremented by 1.

In step 806, it is determined whether or not the storage region U(u) has a plurality of symbol groups. At this point, since a plurality of symbol groups belonging to the first group have been stored in the storage region U(u), if, on the one hand, the determination is NO, step 806 will advance to step 820 because the symbol groups stored in the storage region U(u) belong to a group other than the first group.

If, on the other hand, the determination in step 806 is YES, the symbol groups stored in the storage region U(u) will belong to the first or second group. In this case, in step 808, it is determined whether or not each of the symbol groups stored in the storage region U(u) is the symbol group of closed regions of the same area. If, on the one hand, the determination in step 808 is NO, the symbol-group will belong to the second group and therefore step 808 will advance to step 820. If, on the other hand, the determination in step 808 is YES, since the symbol groups belonging to the first group have been stored in the storage region U(u), in step 810, the variable p for identifying each of the plurality of symbol groups is incremented by 1 and, in step 812, the ID of the Pth symbol group is stored in Gp. In step 812, it is determined whether or not the variable p is equal to or greater than the total number of the symbol groups stored in the storage region U(u), P. If NO, step 814 will return back to step 810 and the foregoing processing (steps 810 to 814) will be repeated. Therefore, the IDs of all symbol groups stored in the storage region U(u) are stored in Gp to GP.

In step 816, it is determined if the symbol groups identified by the IDs of the symbol groups stored in Gp to GP have a child by determining whether there is a symbol that has as a parent the symbol groups identified by the IDs stored in Gp to GP. If, on the one hand, the determination in step 814 is NO, all of the closed regions corresponding to these symbol groups will not include other closed regions and step 816 will advance to step 820.

If, on the other hand, the determination in step 816 is YES, in step 818, it will be determined if each child belongs to the first group. If, on the one hand, the determination in step 818 is YES, step 818 will advance to step 820.

From the foregoing, as a case of advancing to step 820, there is a case that the symbol groups belonging to the second group are stored in the storage region U(u) and the case that all of the closed regions belonging to the first group and corresponding to a child are stored in the storage region U(u). In step 820, a variable y is incremented by 1, in step 822, each of these symbol groups is separately stored in a storage region Y(y), and step 822 advances to step 828. Therefore, the symbol groups belonging to the second group and the symbol groups in which all of the closed regions belonging to the first group and also corresponding to a child belong to the first group are separately stored in the storage region Y(y), respectively, and classified.

If, on the other hand, the determination in step 818 is NO, step 818 will advance to step 824. When the determination in step 818 is NO, each of the symbol groups belonging to the first group has a child and at the same time each child does not belong to the first group. Therefore, in step 824, the variable y is incremented by 1, in step 826, the variable is stored in the yth storage position of the storage region Y(y), and step 826 advances to step 828.

In step 828, it is determined whether or not the variable u is equal to or greater than the total number of the symbol groups stored in the storage region U(u), U. If, on the one hand, the determination in step 828 is NO, step 828 will return to the step 804 and the foregoing processing (steps 804 to 828) will be repeated, because all of the symbol groups stored in the storage region U(u) have not been main-classified. If, on the other hand, the determination in step 828 is YES, this processing will be completed because all of the symbol groups stored in the storage region U(u) have been main-classified.

As the result of the foregoing processing, the symbol group of closed regions having as a child the closed region belonging to the first group is classified from a set of symbol groups belonging to the first group.

Figure 20:
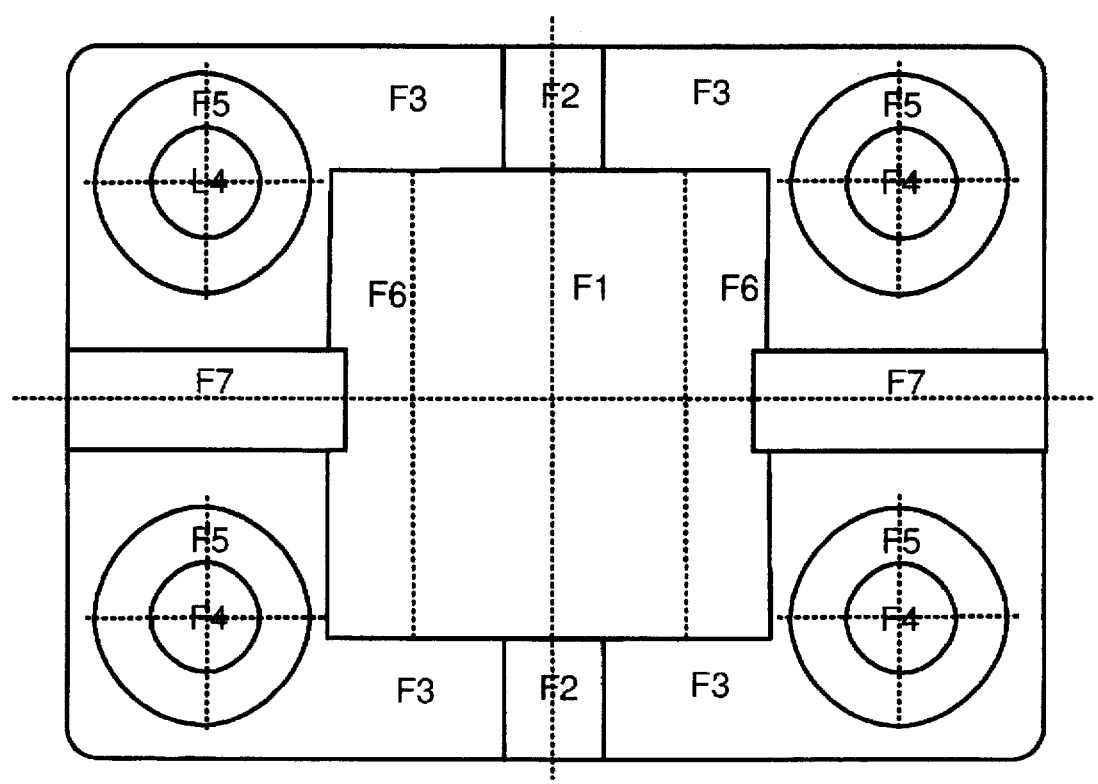
FIG. 20 is a top view showing the closed regions classified by one classification of the closed regions.

For example, as shown in FIG. 20, closed regions F4 are a group of closed regions of the same shape and area having no child, closed regions F5 are a group of closed regions having the closed region F4 as a child, and closed regions F3 are a group of closed regions having the closed region F5 as a child.

Figure 23:
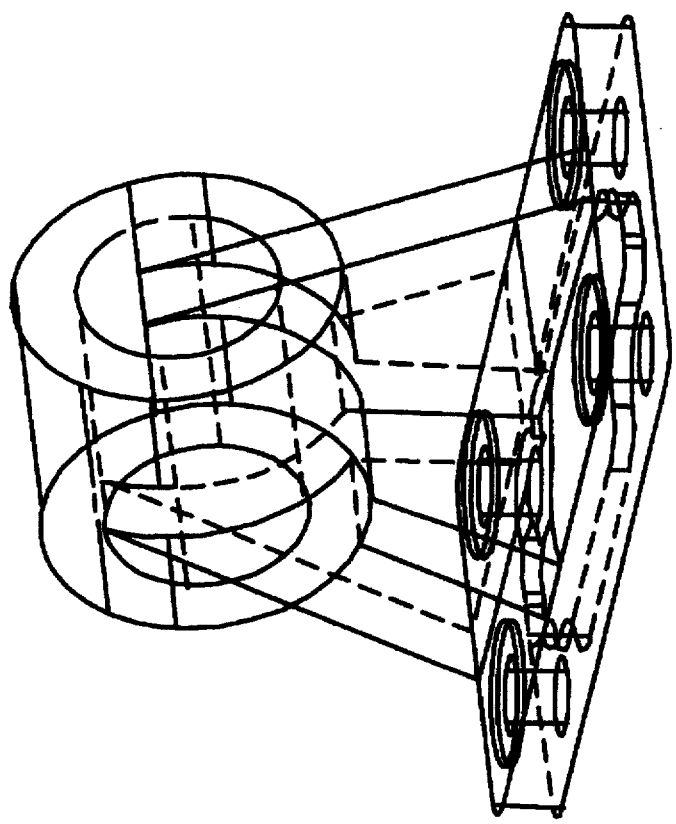
FIG. 23 is a diagram showing a synthesized solid model.
Figure 23:
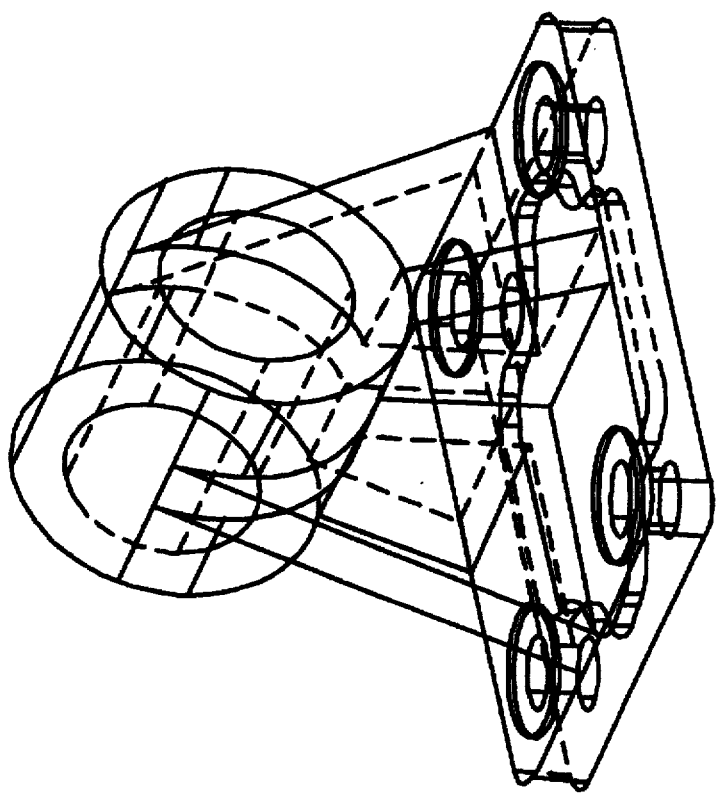

The details (FIG. 14) of step 900 will be described next. First, in step 904, closed regions with a section that have been formed into a three-dimensional shape are arranged. For closed regions having no section, in step 906, the closed regions identified as the same group by the above-described processing and formed into a three-dimensional shape are likewise arranged. In step 908, the above-described solid and a solid which will be described later are synthesized. Therefore, a solid model such as that shown in FIG. 23 is synthesized. That is, in this embodiment of the present invention, the closed region lists of all closed regions are symbolized and classified into certain groups, when a solid model is synthesized based on section information by a sectional drawing.

Therefore, the embodiment of the present invention can obtain the shape characteristics of all closed regions and synthesize an accurate solid model, as compared with the case that, for portions to which section information is not given by a sectional drawing, they are formed into a solid shape by analogy. In addition, since the closed region lists of all closed regions are symbolized and the shape characteristics of all closed regions can be obtained, a solid model that can be recognized from different directions, for example, can be synthesized as shown in FIG. 23.

According to the embodiment described hereinbefore, the closed region lists are converted to a plurality of symbol groups each of which is a set of symbols representative of elements constituting the contour line of the closed region and symbols representative of a connection relationship between the elements. By using a pattern matching method to the converted a plurality of symbol groups, all closed regions are classified into a plurality of groups by an equivalent relationship such as "Contour shapes are the same," and the classified groups are further classified into a plurality of groups by an equivalent relationship such as "Areas are the same." If, in order to form, based on the classified regions, the closed regions into a three-dimensional shape, the closed regions corresponding to the symbol groups belonging to the same group are not formed individually into a three-dimensional shape from drawing data by a mathematical conversion but are formed into a three-dimensional shape by forming one symbol group belonging to the same group into a three-dimensional shape, other symbol groups belonging to the same group can be formed into a three-dimensional shape, based on that formation of a three-dimensional shape of the one symbol group and therefore the synthesis of a solid model can be performed effectively.

In addition, in the above-described embodiment, since matching is performed between shape patterns stored and each of the symbol groups, the shape of closed regions can be specified with reliability and an accurate solid model can be synthesized.

In addition, since a symbol group not matching the stored shape patterns is stored as a new shape pattern in the work memory 24, a closed region with a shape different from the stored shape patterns can be specified and an accurate solid model can be synthesized.

In addition, when the converted symbol groups includes a symbol group having a specific symbol representative of a specific connection relation between the elements, that symbol group is divided into a plurality of groups based on that specific symbol. Therefore, the closed region and the symbol group can be matched with reliability and an accurate solid model can be synthesized.

While, in the above-described embodiment the first symbol comprises a line, a counterclockwise circular arc, and a clockwise circular arc, it is not limited to these. A symbol representative of an ellipse, for example, may be employed.

As a symbol representative of an ellipse, for example, there may be employed a symbol counterclockwise from the long radius side to the short radius side, a symbol clockwise from the long radius side to the short radius side, a symbol counterclockwise from the short radius side to the long radius side, and a symbol clockwise from the short radius side to the long radius side.

In addition, while in the second symbol of the above-described embodiment a change in tangential angle between the contour lines before and after a connection point has been symbolized at an angle of 90°, it is not limited to this. The change may, for example, be symbolized at an angle of 45°.

According to the present invention described hereinbefore, classified drawing data groups is converted to a plurality of symbol groups each of which is a set of first symbols representative of elements constituting the contour line of the closed region and second symbols representative of a connection relationship between the elements, the converted symbol groups are classified in accordance with the classification of the closed region, and the detected closed regions are formed into a three-dimensional shape, based on the classified symbol groups. Since each of the drawing data groups of the closed regions is converted and the closed regions are formed into a three-dimensional shape, the shape of the closed regions can be formed accurately into a three-dimensional shape. Also, if, in order to form, based on the classified groups, the closed regions into a three-dimensional shape, the closed regions are not formed individually into a three-dimensional shape from drawing data by a mathematical conversion but are formed into a three-dimensional shape by forming one symbol group of the classified symbol groups into a three-dimensional shape, other symbol groups can be formed into a three-dimensional shape, based on that formation of a three-dimensional shape of the one symbol group, and therefore the synthesis of a solid model can be performed effectively.

What is claimed is:

1. A solid model synthesis system, which comprises:
    closed region detection means for detecting a plurality of closed regions, each constituted by a contour line, based on drawing data representative of an input three-dimensional shape;
    drawing data group classification means for classifying said drawing data into a plurality of drawing data groups, each of which is a set of drawing data for each of the detected closed regions, based on the detected closed regions;
    symbol group conversion means for converting said plurality of drawing data groups to a plurality of corresponding symbol groups, each of which is a set of first kind of symbols representative of all elements constituting said contour line of the detected closed region and a second symbols representative of a connection relationship between said elements;
    position information detection means for detecting position information representative of a positional relationship between said plurality of closed regions detected by said closed region detection means;
    attribute detection means for detecting an attribute of each of said plurality of closed regions, based on the classified drawing data groups;
    symbol group classification means for classifying said plurality of converted symbol groups in accordance with the classification of the closed region, based on at least one of the first symbol, second symbol, position information, and the attribute;
    three-dimensional shape formation means for forming said detected closed regions into a three-dimensional shape, based on the classified symbol groups; and
    solid model synthesis means for synthesizing the closed regions formed into the three-dimensional shape, based on the detected position information.

2. The solid model synthesis system as claimed in claim 1 wherein said symbol group classification means classifies symbol groups that are the same from among said symbol groups converted.

3. The solid model synthesis system as claimed in claim 2 wherein said symbol group classification means classifies symbol groups that have the same attribute from said symbol groups found to be the same.

4. The solid model synthesis system as claimed in claim 3 wherein said symbol group classification means classifies symbol groups that correspond to a closed region, and which have the same attribute, from among the symbol groups of closed regions based on said first symbols, said second symbols, said position information, and said attribute.

5. The solid model synthesis system as claimed in claim 2 wherein said symbol group classification means classifies symbol groups that are the same from said plurality of converted symbol groups, based on a plurality of shape patterns stored in storage means for storing shape patterns constituted by said first and second symbols and on each of said plurality of data groups.

6. The solid model synthesis system as claimed in claim 5 wherein said symbol group classification means classifies symbol groups that are the same from said plurality of converted symbol groups by performing matching between the stored shape patterns and each of said plurality of symbol groups.

7. The solid model synthesis system as claimed in claim 5 wherein said symbol group classification means stores a symbol group not matching stored shape patterns in said storage means as a new shape pattern after said matching.

8. The solid model synthesis system as claimed in claim 1 wherein said attribute detection means detects an area of each of said plurality of closed regions as said attribute.

9. The solid model synthesis system as claimed in claim 1 wherein said symbol group conversion means converts said plurality of drawing data groups into a plurality of symbol groups by converting each drawing data group of said plurality of drawing data groups into said first symbols representative of elements constituting said contour line of the closed region and its said second symbols representative of a connection relationship between said elements, and determines whether the said converted drawing data groups have a symbol group having a specific symbol representative of a specific connection relationship between said elements, and, if said symbol groups having a specified symbol is found, divides said symbol group into a plurality of symbol groups based on said specific symbol.

10. A solid model synthesis method comprising the steps of:

detecting a plurality of closed regions, each constituted by a contour line, based on drawing data representative of an input three-dimensional shape;

classifying said drawing data into a plurality of drawing data groups, each of which is a set of drawing data for each of the detected closed regions, based on the detected closed regions;

converting said plurality of drawing data groups to a plurality of symbol groups, each of which is a set of first symbols representative of elements constituting said contour line of the closed region and second symbols representative of a connection relationship between said elements;

detecting position information representative of a positional relationship between said detected closed regions;

detecting an attribute of each of said plurality of closed regions, based on the classified drawing data groups;

classifying said plurality of converted symbol groups in accordance with the classification of the closed region, based on at least one of the first symbol, second symbol, position information, and an attribute;

forming said detected closed regions into a three-dimensional shape, based on the classified symbol groups; and synthesizing the closed regions formed into the three-dimensional shape, based on the detected position information.

11. The solid model synthesis method as claimed in claim 10 wherein symbol groups that are the same are classified from said plurality of converted symbol groups based on the first and second symbols.

12. The solid model synthesis method as claimed in claim 11 wherein symbol groups of closed regions that have the same attribute are distinguished from among the symbol groups found to be the same based on said said attribute.

13. The solid model synthesis method as claimed in claim 12 wherein symbol groups that are the same and that correspond to a closed region, are classified from the symbol groups of closed regions having the same attribute based on said first symbol, said second symbols, said position information, and said attribute.

14. The solid model synthesis method as claimed in claim 11 wherein symbol groups that are the same are classified from said plurality of converted symbol groups, based on a plurality of shape patterns stored in storage means for storing shape patterns constituted by said first and second symbols and on each of said plurality of data groups.

15. The solid model synthesis method as claimed in claim 14 wherein said symbol groups that are the same are classified from said plurality of converted symbol groups by performing matching between the stored shape patterns and each of said plurality of symbol groups.

16. The solid model synthesis method as claimed in claim 15 wherein a symbol group not matching stored shape patterns in said storage means is added to said storage means as a new shape pattern after said matching.

17. The solid model synthesis method as claimed in claim 10 wherein an area of each of said plurality of closed regions has an attribute detected by said attribute detecting step.

18. The solid model synthesis method as claimed in claim 12 wherein said plurality of drawing data groups is converted to a plurality of symbol groups by converting each drawing data group of said plurality of drawing data groups into said first symbols representative of elements constituting said contour line of the closed region and into said second symbols representative of a connection relationship between said elements, and wherein it is determined whether the converted drawing data groups have a symbol group having a specific symbol representative of a specific connection relationship between said elements, and, if said symbol group having a specified symbol is found, said symbol group is divided into a plurality of symbol groups based on said specific symbol.

* * * * *